US011511594B2

(12) United States Patent
Yonezu et al.

(10) Patent No.: US 11,511,594 B2
(45) Date of Patent: Nov. 29, 2022

(54) AIR-CONDITIONING UNIT FOR VEHICLE

(71) Applicant: DENSO CORPORATION, Kariya (JP)

(72) Inventors: Yasue Yonezu, Kariya (JP); Yoshinori Tashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 16/748,841

(22) Filed: Jan. 22, 2020

(65) Prior Publication Data

US 2020/0156433 A1     May 21, 2020

Related U.S. Application Data

(63) Continuation of application No. PCT/JP2018/023639, filed on Jun. 21, 2018.

(30) Foreign Application Priority Data

Jul. 25, 2017    (JP) ............................. JP2017-143857

(51) Int. Cl.
     *B60H 1/00*          (2006.01)
     *F04D 29/54*        (2006.01)

(52) U.S. Cl.
     CPC ..... *B60H 1/00021* (2013.01); *B60H 1/00471* (2013.01); *B60H 1/00521* (2013.01);
(Continued)

(58) Field of Classification Search
     CPC ...... B60H 1/00021; B60H 2001/00092; B60H 2001/00135; B60H 1/00564; B60H 1/00521; B60H 2001/00721; B60H 1/00064; B60H 1/00057; B60H 1/00842; B60H 2001/00107; F04D 29/44; F04D 27/005; F04D 29/541; F04D 29/542; F04D 29/544; F04D 19/007; F04D 29/703; F04D 17/08; F04D 17/02; F04D 17/0608; F04D 29/281; F04D 25/10; F04D 29/54;
(Continued)

(56) References Cited

U.S. PATENT DOCUMENTS 2,544,379 A *   3/1951   Davenport ............ F04D 29/544
                                                                454/344
6,406,258 B1 *   6/2002   Lin ....................... F04D 29/547
                                                                415/214.1
(Continued)

FOREIGN PATENT DOCUMENTS

JP        2011121430 A      6/2011
JP        2016011101 A      1/2016
(Continued)

*Primary Examiner* — Steven B Mcallister
*Assistant Examiner* — Cole N Friedman
(74) *Attorney, Agent, or Firm* — Harness, Dickey & Pierce, P.L.C.

(57) ABSTRACT

In an air conditioning case, a blower sucks air flowing out from first and second upstream side ventilation paths from one side in an axial direction of a fan axis by rotation of a blower fan and allows the sucked air to flow to first and second downstream side ventilation paths. An upstream side guide member is provided on one side in the axial direction with respect to the blower fan and guides the air to the blower fan. Further, the upstream side guide member has a twisted shape and guides the air to the blower fan along the twisted shape.

16 Claims, 18 Drawing Sheets

(52) U.S. Cl.
CPC .............. *B60H 1/00564* (2013.01); *B60H 2001/00092* (2013.01); *F04D 29/541* (2013.01)

(58) Field of Classification Search
CPC .......... F04D 29/526; F04D 29/547; F24F 2013/088; F24F 2013/205; F24F 2203/1048; F24F 2203/1068; F01D 9/00; F01D 9/04; F05D 2240/12; F05D 2240/10
USPC .......... 454/139, 234; 415/211.2, 224, 224.5, 415/206
See application file for complete search history.

(56) References Cited

U.S. PATENT DOCUMENTS

| | | | | |
|---|---|---|---|---|
| 6,508,621 B1* | 1/2003 | Zeighami | ............. | F04D 25/166 415/199.2 |
| RE39,774 E* | 8/2007 | Chang | ................. | F04D 29/544 416/247 R |
| 7,275,910 B2* | 10/2007 | Chang | ................. | F04D 29/542 415/220 |
| 8,197,198 B2* | 6/2012 | Miyabara | ............. | F04D 19/007 415/209.1 |
| 8,511,981 B2* | 8/2013 | Small | ................... | F04D 25/163 415/209.2 |
| 9,022,732 B2* | 5/2015 | Prunieres | ............. | F04D 29/448 415/206 |
| 2005/0076668 A1* | 4/2005 | Choi | ...................... | E04F 17/04 62/426 |
| 2008/0138201 A1* | 6/2008 | Lin | .................... | F04D 25/0613 415/209.4 |
| 2010/0272567 A1* | 10/2010 | Horng | ................ | F04D 25/0613 415/208.2 |
| 2015/0082820 A1* | 3/2015 | Takahashi | ........... | B60H 1/0005 62/238.7 |
| 2016/0288609 A1 | 10/2016 | Yamaoka et al. | | |

FOREIGN PATENT DOCUMENTS

| | | |
|---|---|---|
| JP | 2016-044586 A | 4/2016 |
| WO | WO-2019/021707 A1 | 1/2019 |

* cited by examiner

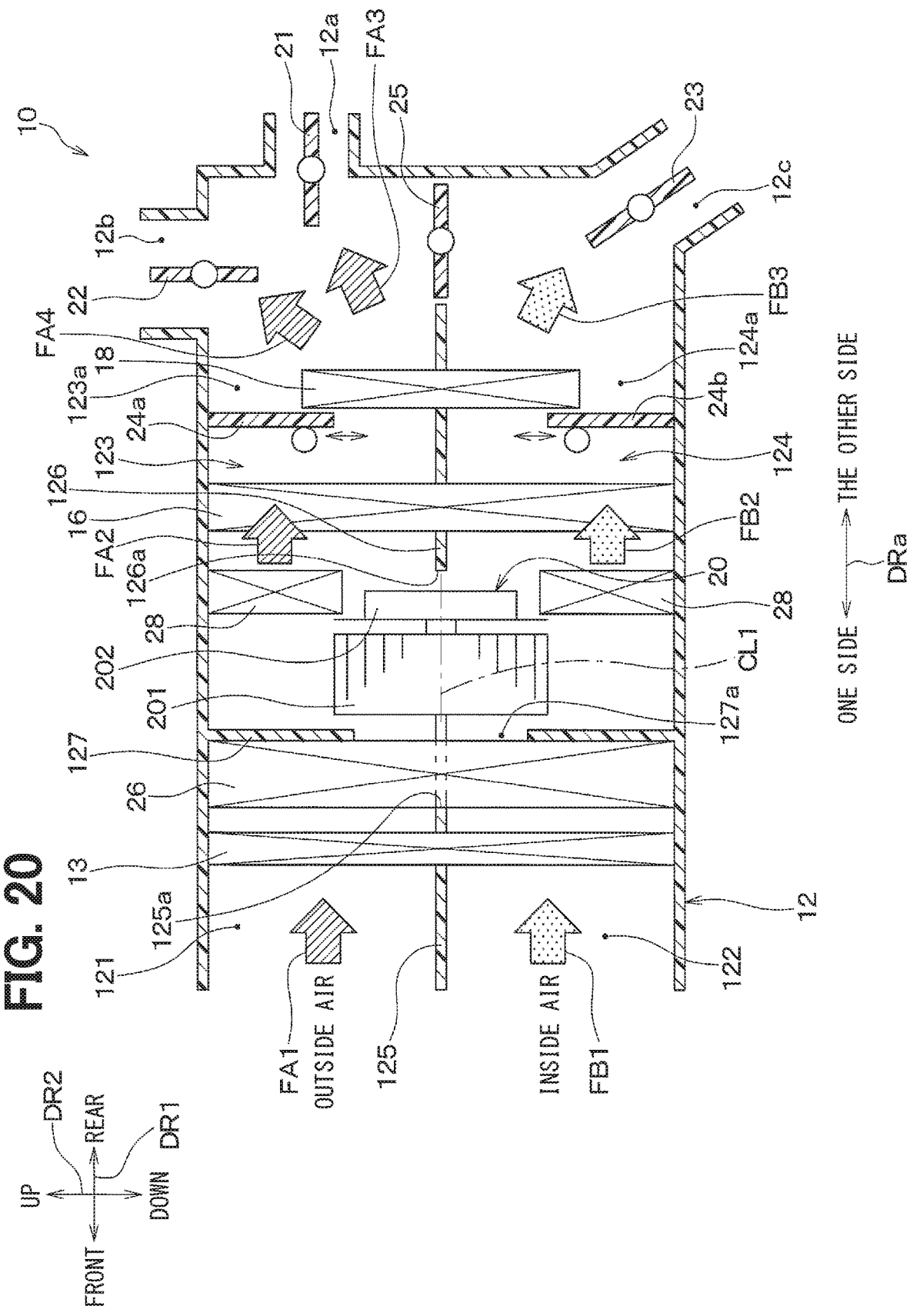

AIR-CONDITIONING UNIT FOR VEHICLE

CROSS REFERENCE TO RELATED APPLICATIONS

This application is a continuation application of International Patent Application No. PCT/JP2018/023639 filed on Jun. 21, 2018, which designated the U.S. and claims the benefit of priority from Japanese Patent Application No. 2017-143857 filed on Jul. 25, 2017. The entire disclosure of all of the above applications are incorporated herein by reference.

TECHNICAL FIELD

The present disclosure relates to an air-conditioning unit for a vehicle.

BACKGROUND ART

An air-conditioning unit for a vehicle includes a blower fan that sucks and blows out air from a plurality of air passages in a casing, and a suction side partition member arranged on a suction side of the blower fan in the casing. In addition, the air-conditioning unit includes a blow-out side partition member arranged on a blow-out side of the blower fan in the casing. Each of the suction side partition member and the blow-out side partition member partitions air flows from the plurality of air passages from each other, and the mixing of a plurality of air flows is suppressed by partitioning the air flows as described above.

SUMMARY

An air-conditioning unit for a vehicle according to one aspect of the present disclosure includes:

an air conditioning case that defines therein a first upstream side ventilation path through which air flows, a second upstream side ventilation path through which air flows and which is in parallel with the first upstream side ventilation path, a first downstream side ventilation path through which the air flowing out from the first upstream side ventilation path flows, and a second downstream side ventilation path which is in parallel with the first downstream side ventilation path and through which the air flowing out from the second upstream side ventilation path flows;

a blower that includes a blower fan rotating about a fan axis in the air conditioning case, the blower drawing in air flowing out of the first upstream side ventilation path and the second upstream side ventilation path from one side in an axial direction of the fan axis by rotation of the blower fan, the blower causing the drawn air to flow toward the first downstream side ventilation path and the second downstream side ventilation path; and an upstream side guide member that is located on the one side of the blower fan in the axial direction in the air conditioning case and guides, toward the blower fan, the air flowing out of the first upstream side ventilation path and the second upstream side ventilation path from the one side to the other side that is opposite to the one side in the axial direction, wherein the upstream side guide member has a twisted shape in which the other side of the upstream side guide member in the axial direction is twisted relative to the one side thereof about the fan axis in a direction opposite to a rotation direction of the blower fan, and the upstream side guide member guides the air toward the blower fan along the twisted shape.

BRIEF DESCRIPTION OF DRAWINGS

The above and other objects, features and advantages of the present disclosure will become more apparent from the following detailed description made with reference to the accompanying drawings.

FIG. 20 is a schematic cross-sectional view showing a schematic configuration of an air-conditioning unit for vehicles in another embodiment, and is a view corresponding to FIG. 1.

DESCRIPTION OF EMBODIMENTS

Figure 1:
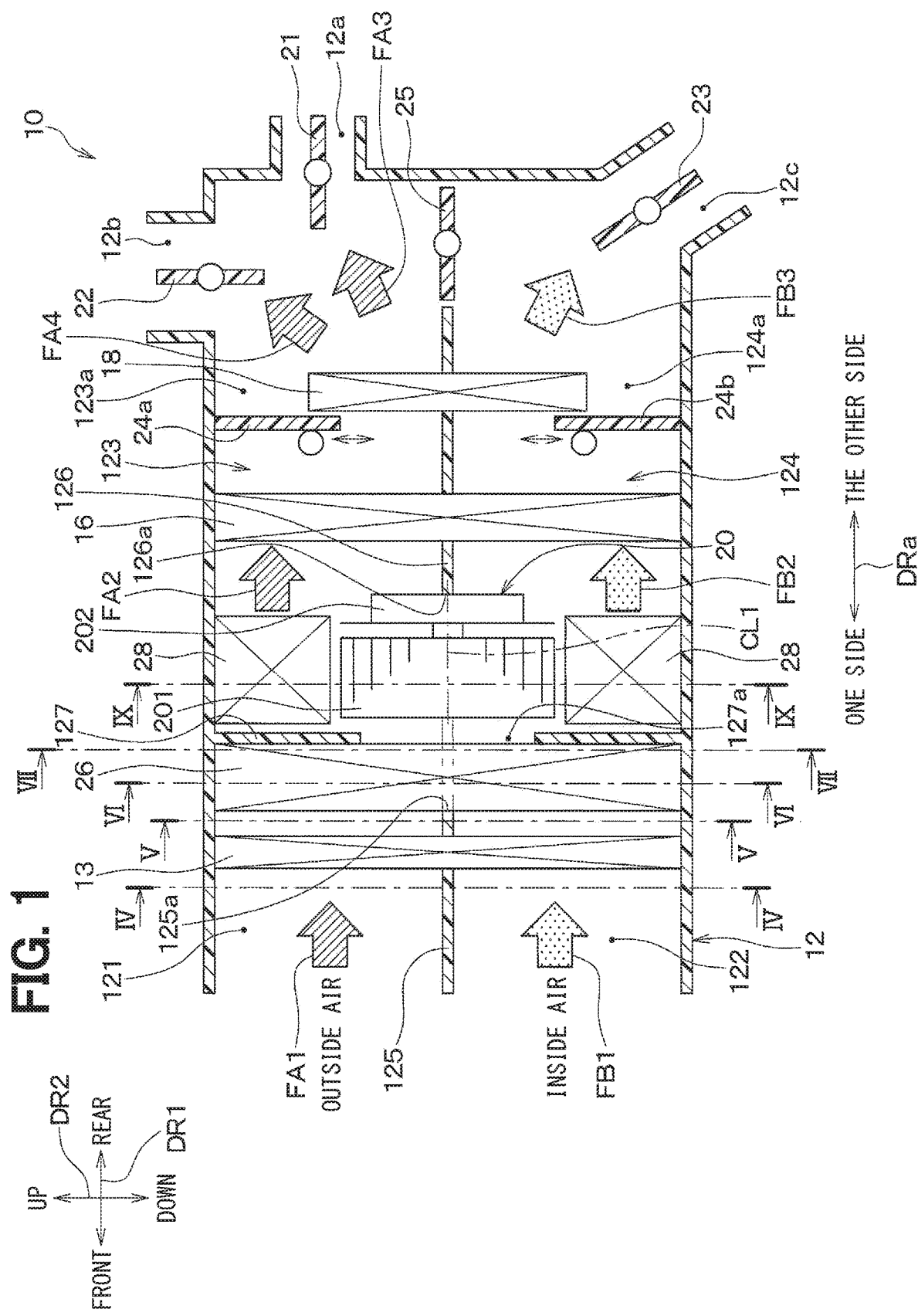
FIG. 1 is a schematic cross-sectional view showing a schematic configuration of an air-conditioning unit for vehicles in a first embodiment.

Hereinafter, each embodiment will be described with reference to the drawings. Note that in each of the following embodiments, portions that are the same as or equivalent to each other are denoted by the same reference numerals in the drawings.

The suction side partition member and the blow-out side partition member as described above are typically arranged so that a relative position of the blow-out side partition member with respect to the suction side partition member is shifted in a rotation direction of the blower fan. Further, the relative position of the blow-out side partition member with respect to the suction side partition member is adjusted by rotating the suction side partition member by an electric actuator.

Such an air-conditioning unit is configured to allow air flowing out from a plurality of upstream side ventilation paths in the casing, that is, an air conditioning case, to flow to a plurality of downstream side ventilation paths through the blower fan. In such an air-conditioning unit for vehicles, each air flow flowing out from the plurality of upstream side ventilation paths is rotated about a fan axis by rotation of the blower fan and then flows into the plurality of downstream side ventilation paths. That is, each air flow flowing out from the plurality of upstream side ventilation paths generates a phase shift about the fan axis in a mutual arrangement of the air flows due to the rotation of the blower fan, and flows into the plurality of downstream side ventilation paths.

On the other hand, a case where it is desired to suppress the phase shift of each air flow due to the rotation of the blower fan is assumed. For example, in an air conditioning unit having a two-layer structure of inside and outside air, in order to achieve both of ventilation loss reduction and window fogging prevention, window cleaning of a windshield arranged on an upper side of a vehicle is performed using the outside air, and heating of the feet of passengers is performed by the inside air. On the other hand, in order to guide the outside air into a vehicle interior, the outside air needs to be introduced from above the air conditioning unit into the air conditioning case through an outside air introduction duct. Therefore, a ventilation path through which the outside air flows is provided above a ventilation path through which the inside air flows, on both of an air flow upstream side and an air flow downstream side with respect to the blower fan in the air conditioning case.

As such, in various air conditioning units taking the air conditioning unit having the two-layer structure of inside and outside air as an example, a case where it is preferable to suppress the phase shift of each air flow due to the rotation of the blower fan is assumed. Therefore, the inventors of the present disclosure have considered to suppress the phase shift using the suction side partition member.

However, since the suction side partition member adjusts the phase shift by being rotated, a step is generated in a connection portion between a partition wall partitioning an air passage on an air flow upstream side with respect to the suction side partition member and the suction side partition member depending on a rotation position of the suction side partition member. Since the step locally deforms a route of an air flow along the suction side partition member, there was a possibility that the step would cause the air flow along the suction side partition member to be disturbed. As a result of detailed studies by the inventors, the problems as described above have been found.

The present disclosure has been made in view of the above, and an objective of one aspect of the present disclosure is to suppress a phase shift around a fan axis generated in a mutual arrangement of a plurality of air flows due to rotation of a blower fan between a plurality of upstream side ventilation paths and a plurality of downstream side ventilation paths while smoothly guiding an air flow to an air flow upstream side or downstream side with respect to the blower fan.

An air-conditioning unit for a vehicle according to one aspect of the present disclosure includes:

an air conditioning case that defines therein a first upstream side ventilation path through which air flows, a second upstream side ventilation path through which air flows and which is in parallel with the first upstream side ventilation path, a first downstream side ventilation path through which the air flowing out from the first upstream side ventilation path flows, and a second downstream side ventilation path which is in parallel with the first downstream side ventilation path and through which the air flowing out from the second upstream side ventilation path flows;

a blower that includes a blower fan rotating about a fan axis in the air conditioning case, the blower drawing in air flowing out of the first upstream side ventilation path and the second upstream side ventilation path from one side in an axial direction of the fan axis by rotation of the blower fan, the blower causing the drawn air to flow toward the first downstream side ventilation path and the second downstream side ventilation path; and an upstream side guide member that is located on the one side of the blower fan in the axial direction in the air conditioning case and guides, toward the blower fan, the air flowing out of the first upstream side ventilation path and the second upstream side ventilation path from the one side to the other side that is opposite to the one side in the axial direction, wherein the upstream side guide member has a twisted shape in which the other side of the upstream side guide member in the axial direction is twisted relative to the one side thereof about the fan axis in a direction opposite to a rotation direction of the blower fan, and the upstream side guide member guides the air toward the blower fan along the twisted shape.

According to such a configuration, the respective air flows flowing out from the first and second upstream side ventilation paths are rotated in the opposite direction to the rotation direction of the blower fan in advance, and then flow into the blower fan. This acts in a direction in which a phase shift around the fan axis generated due to the rotation of the blower fan in a mutual arrangement of a plurality of air flows is canceled, and it is thus possible to suppress the phase shift.

Since the upstream side guide member guides the air to the blower fan along the twisted shape, it is possible to avoid the generation of the step caused by the suction side partition member as described above. For that reason, it is possible to smoothly guide the air flow on the air flow upstream side with respect to the blower fan.

An air-conditioning unit for a vehicle according to another aspect includes:

an air conditioning case that defines a first upstream side ventilation path through which air flows, a second upstream side ventilation path through which air flows and which is in parallel with the first upstream side ventilation path, a first downstream side ventilation path through which the air flowing out of the first upstream side ventilation path flows, and a second downstream side ventilation path which is in parallel with the first downstream side ventilation path and through which the air flowing out of the second upstream side ventilation path flows;

a blower that includes a blower fan rotating around a fan axis in the air conditioning case, the blower drawing in air flowing out of the first upstream side ventilation path and the second upstream side ventilation path from one side of the fan axis in an axial direction by rotation of the blower fan, the blower causing the brawn air to flow toward the first downstream side ventilation path and the second downstream side ventilation path; and a plurality of downstream side guide members that are disposed in the air conditioning case and guide the air flowing out from the blower fan toward the first downstream side ventilation path and the second downstream side ventilation path, wherein the plurality of downstream side guide members are configured to decrease a rotation component, which is given by the rotation of the blower fan, of a flow velocity of the air flowing out from the blower fan by guiding the air flowing out from the blower fan along the plurality of downstream side guide members.

According to such a configuration, as compared with a case where the downstream side guide members are not provided, it becomes difficult for the air flowing out from the blower fan to proceed in the rotation direction of the blower fan before flowing into each of the first and second downstream side ventilation paths. For that reason, it is possible to suppress the phase shift around the fan axis generated in the mutual arrangement of the plurality of air flows described above.

Similar to the air-conditioning unit for vehicles according to one aspect described above, it is possible to avoid the generation of the step caused by the suction side partition member by the downstream side guide members. For that reason, it is possible to smoothly guide the air flow on the air flow downstream side with respect to the blower fan.

First Embodiment

As shown in FIG. 1, an air-conditioning unit 10 for vehicles according to the present embodiment includes an air conditioning case 12, a filter 13, an evaporator 16, a heater core 18, a blower 20, a plurality of doors 21, 22, 23, 24a, 24b, and 25, an upstream side guide member 26, and a plurality of downstream side guide members 28. The air-conditioning unit 10 for vehicles is arranged, for example, inside an instrument panel provided at the foremost portion in a vehicle interior. Note that illustration of the respective guide members 26 and 28 in FIG. 1 indicate positions of the respective guide members 26 and 28 in a front and rear direction DR1 of the vehicle, and FIG. 1 is not a view showing specific shapes of the guide members 26 and 28.

Figure 4:
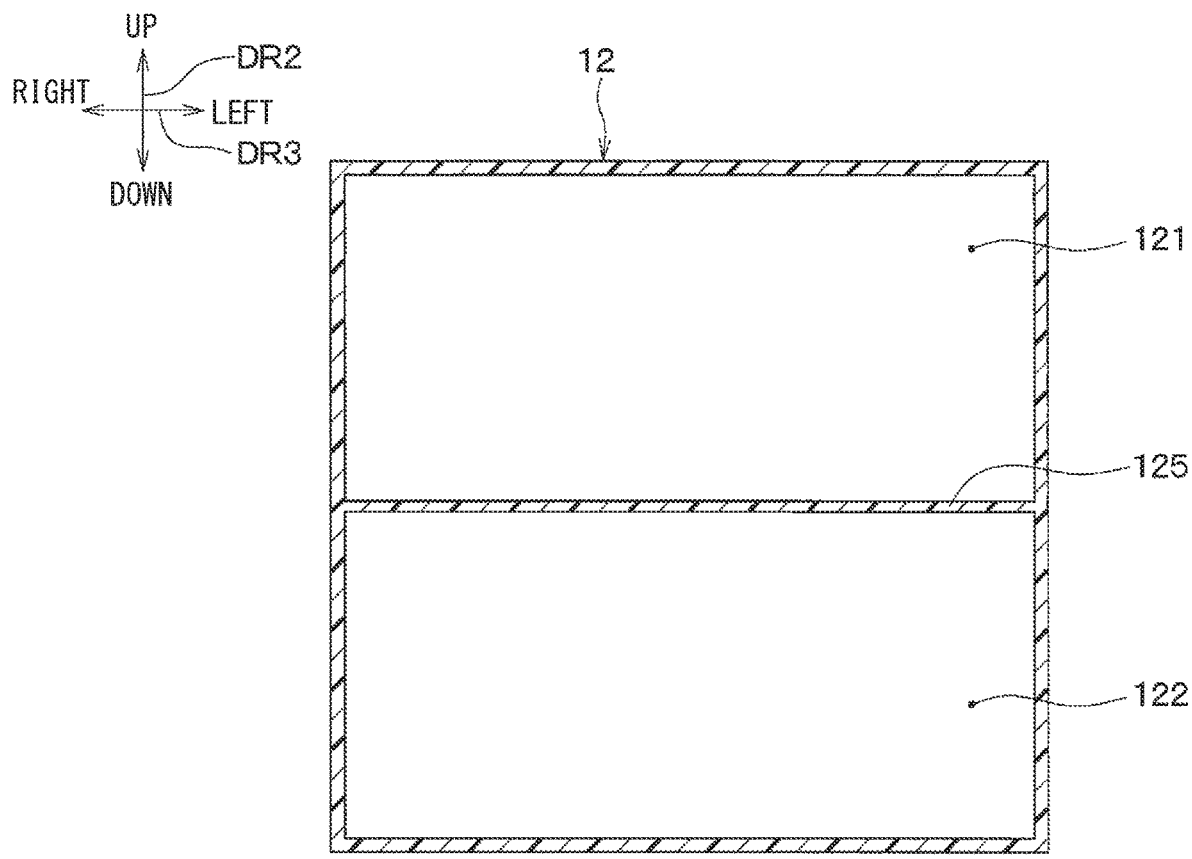
FIG. 4 is a cross-sectional view showing a cross section taken along line IV-IV of FIG. 1 in the first embodiment.

In addition, respective arrows DR1, DR2, and DR3 in FIGS. 1 and 4 indicate directions of a vehicle in which the air-conditioning unit 10 for vehicles is mounted. That is, an arrow DR1 in FIG. 1 indicates a front and rear direction DR1 of the vehicle, an arrow DR2 in FIG. 1 indicates an up and down direction DR2 of the vehicle, and an arrow DR3 in FIG. 4 indicates a left and right direction DR3 of the vehicle, that is, a width direction DR3 of the vehicle. These directions DR1, DR2, and DR3 are directions intersecting each other, strictly speaking, directions orthogonal to each other.

Figure 2:
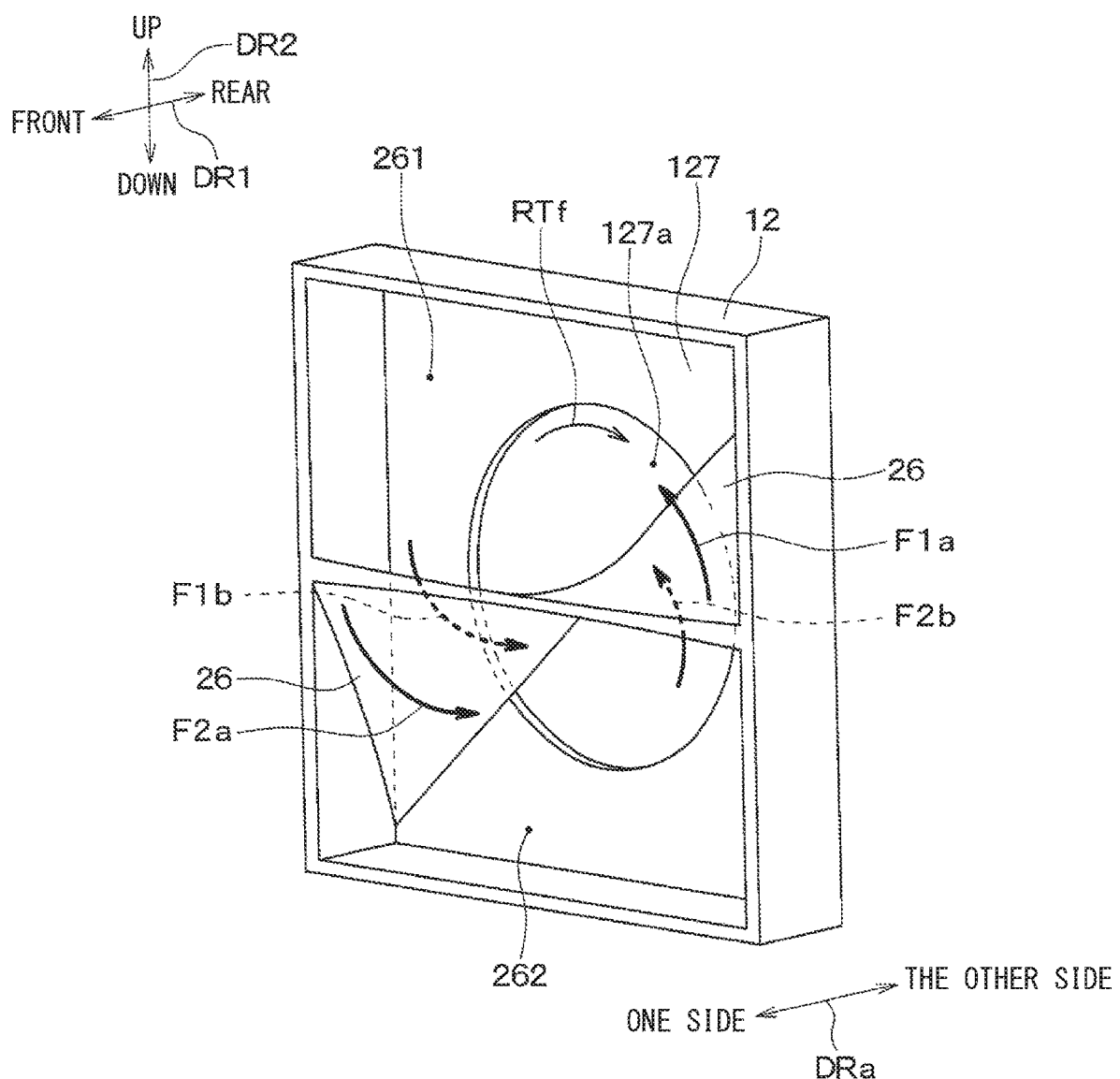
FIG. 2 is a perspective view extracting and showing an upstream side guide member and peripheral portions thereof in the first embodiment.
Figure 3:
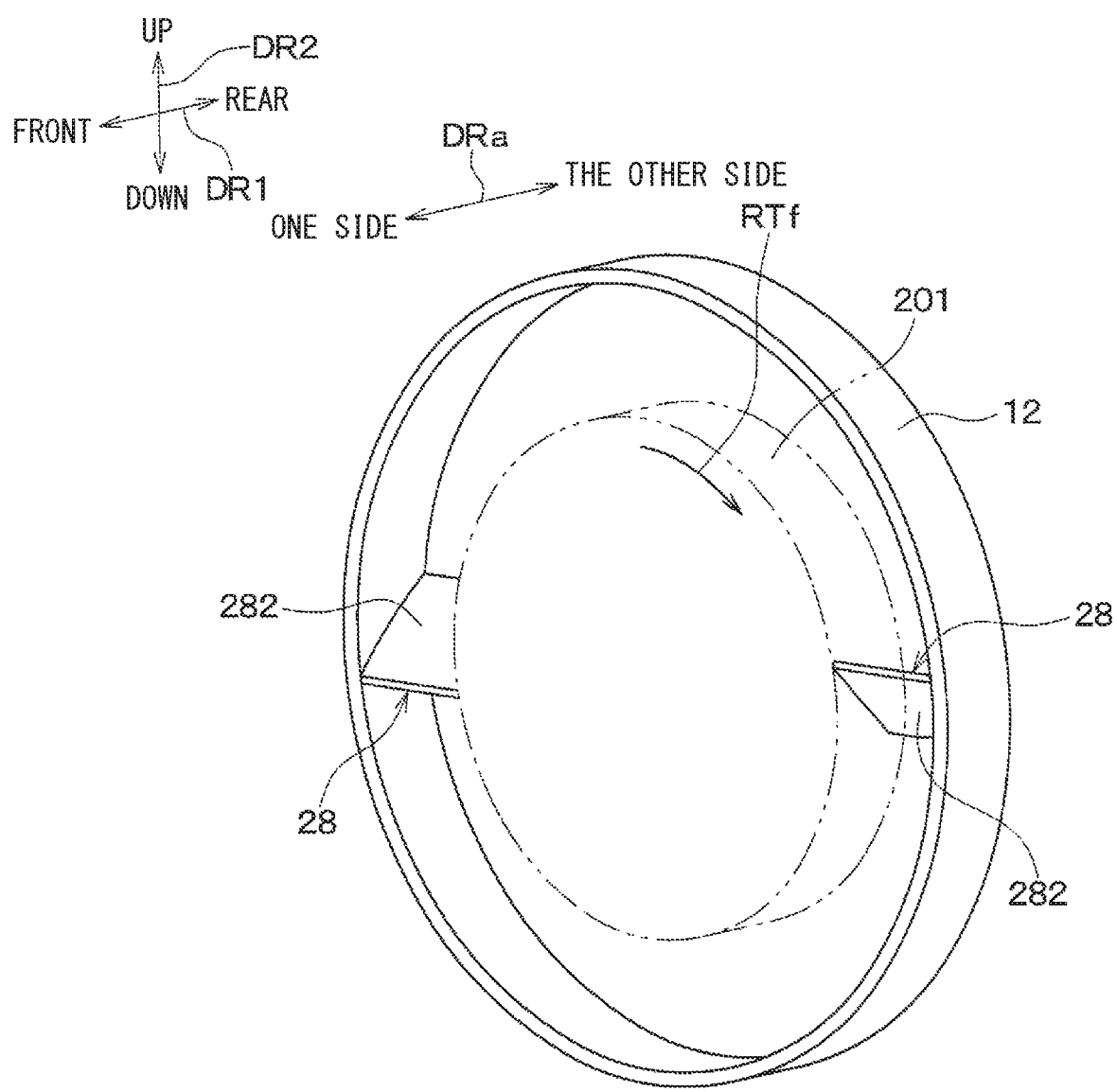
FIG. 3 is a perspective view extracting and showing a downstream side guide member and peripheral portions thereof in the first embodiment.

The air conditioning case 12 is a member forming an outer shell of the air-conditioning unit 10 for vehicles and formed of a resin. The air conditioning case 12 has a tubular shape extending in the front and rear direction DR1 of the vehicle as a whole. For example, the air conditioning case 12 basically has a tubular shape with a rectangular cross section as shown in FIG. 2, but has a cylindrical shape in a portion of the blower 20 accommodating a blower fan 201 as shown in FIG. 3.

As shown in FIG. 1, a plurality of upstream side ventilation paths 121 and 122 through which air flows and a plurality of downstream side ventilation paths 123 and 124 through which air flows are formed inside the air conditioning case 12. For example, all of these ventilation paths 121, 122, 123, and 124 are formed so as to extend in the front and rear direction DR1 of the vehicle.

The plurality of upstream side ventilation paths 121 and 122 formed in the air conditioning case 12 are specifically a first upstream side ventilation path 121 and a second upstream side ventilation path 122 in the present embodiment. The second upstream side ventilation path 122 is a ventilation path provided in parallel with the first upstream side ventilation path 121. As shown in FIGS. 1 and 4, the air conditioning case 12 has an upstream side partition wall 125. The upstream side partition wall 125 is arranged between the first upstream side ventilation path 121 and the second upstream side ventilation path 122, and partitions between the first upstream side ventilation path 121 and the second upstream side ventilation path 122. In short, the upstream side partition wall 125 is a partition wall between the first upstream side ventilation path 121 and the second upstream side ventilation path 122. Thus, the first upstream side ventilation path 121 is provided above the second upstream side ventilation path 122.

In addition, as shown in FIG. 1, the plurality of downstream side ventilation paths 123 and 124 formed in the air conditioning case 12 are specifically a first downstream side ventilation path 123 and a second downstream side ventilation path 124 in the present embodiment. The first downstream side ventilation path 123 is a ventilation path through which air flowing out from the first upstream side ventilation path 121 flows, and the second downstream side ventilation path 124 is a ventilation path through which air flowing out from the second upstream side ventilation path 122 flows. The second downstream side ventilation path 124 is provided in parallel with the first downstream side ventilation path 123.

In addition, the air conditioning case 12 has a downstream side partition wall 126. The downstream side partition wall 126 is arranged between the first downstream side ventilation path 123 and the second downstream side ventilation path 124, and partitions between the first downstream side ventilation path 123 and the second downstream side ventilation path 124. In short, the downstream side partition wall 126 is a partition wall between the first downstream side ventilation path 123 and the second downstream side ventilation path 124. Thus, the first downstream side ventilation path 123 is provided above the second downstream side ventilation path 124.

The filter 13 is formed of, for example, a nonwoven fabric or the like. The filter 13 is accommodated in the air conditioning case 12, and is provided so as to extend over both of the first upstream side ventilation path 121 and the second upstream side ventilation path 122 across the upstream side partition wall 125. The filter 13 filters the air flowing through the first upstream side ventilation path 121, and filters the air flowing through the second upstream side ventilation path 122.

The evaporator 16 is a cooling heat exchanger that cools the air passing through the evaporator 16. The evaporator 16 is accommodated in the air conditioning case 12, and is provided so as to extend over both of the first downstream side ventilation path 123 and the second downstream side ventilation path 124 across the downstream side partition wall 126. The evaporator 16 cools the air flowing through the first downstream side ventilation path 123, and cools the air flowing through the second downstream side ventilation path 124.

For example, the evaporator 16 constitutes a well-known refrigeration cycle apparatus that circulates a refrigerant together with a compressor, a condenser, and an expansion valve (not shown). The evaporator 16 exchanges heat between the air passing through the evaporator 16 and the refrigerant, and evaporates the refrigerant and cools the air by the heat exchange.

The blower 20 has a blower fan 201 that is provided in the air conditioning case 12 and rotates around a fan axis CL1 and a fan motor 202 that rotationally drives the blower fan 201. The blower fan 201 is a centrifugal fan in the present embodiment.

The blower 20, which is a centrifugal blower, sucks air from one side in an axial direction DRa of the fan axis CL1 by the rotation of the blower fan 201, and blows out the sucked air to the outside in a radial direction of the blower fan 201. Note that since the blower fan 201 blows out the air to the outside in the radial direction while rotating, a flow velocity of the air flowing out from the blower fan 201 has not only a velocity component toward the outside in the radial direction but also a rotation component given by the rotation of the blower fan 201. In short, the air flowing out from the blower fan 201 flows in a rotation direction RTf of the blower fan 201 while flowing to the outside in the radial direction of the blower fan 201 unless restricted at all.

Specifically, the blower fan 201 is arranged between the first and second upstream side ventilation paths 121 and 122 and the first and second downstream side ventilation paths 123 and 124 in the axial direction DRa of the fan axis CL1. In detail, the blower fan 201 is arranged on an air flow downstream side with respect to the first upstream side ventilation path 121 and the second upstream side ventilation path 122, and on an air flow upstream side with respect to the first downstream side ventilation path 123 and the second downstream side ventilation path 124. For that reason, the blower 20 sucks the air flowing out from the first upstream side ventilation path 121 and the second upstream side ventilation path 122 from one side in the axial direction DRa of the fan axis CL1 through the upstream side guide member 26 by the rotation of the blower fan 201. At the same time, the blower 20 allows the sucked air to flow to the first downstream side ventilation path 123 and the second downstream side ventilation path 124 through the downstream side guide members 28.

Note that the axial direction DRa of the fan axis CL1 coincides with the front and rear direction DR1 of the vehicle in the present embodiment. In addition, the axial direction DRa of the fan axis CL1 is also referred to as a fan axial direction DRa. In addition, the radial direction of the blower fan 201 is a radial direction of the fan axis CL1. The radial direction of the fan axis CL1 is also referred to as a fan radial direction.

The blower fan 201 of the blower 20 is arranged on an air flow upstream side with respect to the evaporator 16 arranged in the first downstream side ventilation path 123 and the second downstream side ventilation path 124. The blower fan 201 is arranged so that an air suction side of the blower fan 201 faces an opposite side to the first and second downstream side ventilation paths 123 and 124, that is, one side in the fan axial direction DRa.

The first and second downstream side ventilation paths 123 and 124 are arranged such that the respective air inflow sides of the first and second downstream side ventilation paths 123 and 124 are opened toward one side in the fan axial direction DRa. Therefore, the air flows from one side in the fan axial direction DRa into the first and second downstream side ventilation paths 123 and 124, respectively.

That is, the blower fan 201 is arranged in a direction in which the other side of the fan axis CL1 extends to an air flow downstream side of the first and second downstream side ventilation paths 123 and 124. In other words, the blower fan 201 is arranged so that the other side of the blower fan 201 in the fan axial direction DRa faces air inflow sides of the first and second downstream side ventilation paths 123 and 124.

The air conditioning case 12 has a fan case wall 127 arranged on one side in the fan axial direction DRa with respect to the blower fan 201 and on the other side in the fan axial direction DRa with respect to the upstream side guide member 26. The fan case wall 127 partitions the inside of the air conditioning case 12 into one side and the other side in the fan axial direction DRa. A fan suction hole 127a penetrating through the fan case wall 127 in the fan axial direction DRa is formed in a central portion of the fan case wall 127. Therefore, the air sucked into the blower fan 201 by the rotation of the blower fan 201 is sucked from one side in the fan axial direction DRa into the blower fan 201 through the fan suction hole 127a. Note that the other side in the fan axial direction DRa is an opposite side to one side in the fan axial direction DRa.

The heater core 18 is a heater that heats the air passing through the heater core 18. The heater core 18 is accommodated in the air conditioning case 12, and is provided so as to extend over both of the first downstream side ventilation path 123 and the second downstream side ventilation path 124 across the downstream side partition wall 126.

However, the heater core 18 is arranged on an air flow downstream side with respect to the evaporator 16. An upper bypass passage 123a that allows the air to flow in parallel to the heater core 18 is formed above the heater core 18 in the first downstream side ventilation path 123. Further, a lower bypass passage 124a that allows the air to flow in parallel to the heater core 18 is formed below the heater core 18 in the second downstream side ventilation path 124. That is, the bypass passages 123a and 124a are bypass passages that allow the air from the evaporator 16 to bypass the heater core 18 to flow therethrough, respectively.

A first air mix door 24a is provided on an air flow upstream side with respect to the heater core 18 and an air flow downstream side with respect to the evaporator 16 in the first downstream side ventilation path 123. The first air mix door 24a is a slide-type door mechanism, and is slid by an electric actuator (not shown). The first air mix door 24a opens and closes an air inflow side of the heater core 18 and opens and closes the upper bypass passage 123a in the first downstream side ventilation path 123.

The first air mix door 24a adjusts an air volume ratio between an air volume passing through the heater core 18 and an air volume passing through the upper bypass passage 123a according to a slide position thereof.

A second air mix door 24b is provided on the air flow upstream side with respect to the heater core 18 and the air flow downstream side with respect to the evaporator 16 in the second downstream side ventilation path 124. The second air mix door 24b is a slide-type door mechanism, and is slid by an electric actuator (not shown). The second air mix door 24b opens and closes an air inflow side of the heater core 18 and opens and closes the lower bypass passage 124a in the second downstream side ventilation path 124.

The second air mix door 24b adjusts an air volume ratio between an air volume passing through the heater core 18 and an air volume passing through the lower bypass passage 124a according to a slide position thereof.

In the air conditioning case 12, a face blow-out port 12a, a defroster blow-out port 12b, and a foot blow-out port 12c for blowing out the air to the outside of the air conditioning case 12 are formed. The face blow-out port 12a and the defroster blow-out port 12b are connected to the first downstream side ventilation path 123 on the air flow downstream side with respect to the heater core 18 and the upper bypass passage 123a, respectively. In addition, the foot blow-out port 12c is connected to the second downstream side ventilation path 124 on an air flow downstream side with respect to the heater core 18 and the lower bypass passage 124a.

The air flowing out from the face blow-out port 12a is guided through a duct (not shown), and is blown out toward the face or the chest of an occupant seated on a front seat of the vehicle interior. The air flowing out from the defroster blow-out port 12b is guided through a duct (not shown), and is blown out toward a window glass on a front surface of the vehicle in the vehicle interior. The air flowing out from the foot blow-out port 12c is guided through a duct (not shown), and is blown out toward the feet of the occupant seated on the front seat of the vehicle interior.

In addition, the face blow-out port 12a is provided with a face door 21, and the face door 21 opens and closes the face blow-out port 12a. The defroster blow-out port 12b is provided with a defroster door 22, and the defroster door 22 opens and closes the defroster blow-out port 12b. The foot blow-out port 12c is provided with a foot door 23, and the foot door 23 opens and closes the foot blow-out port 12c.

In addition, on an air flow downstream side of the heater core 18 in the first downstream side ventilation path 123, warm air passing through the heater core 18 and cool air passing through the upper bypass passage 123a are mixed with each other. Then, the mixed air is blown out mainly from an opened blow-out port of the face blow-out port 12a and the defroster blow-out port 12b into the vehicle interior.

In addition, on an air flow downstream side of the heater core 18 in the lower bypass passage 124a, warm air passing through the heater core 18 and cool air passing through the lower bypass passage 124a are mixed with each other. Then, the mixed air is blown out mainly from the foot blow-out port 12c into the vehicle interior in a case where the foot blow-out port 12c is opened.

In addition, a ventilation path communication door 25 is provided on the air flow downstream side of the heater core 18 in the downstream side ventilation paths 123 and 124. The ventilation path communication door 25 connects and disconnects communication between two downstream side ventilation paths 123 and 124 on the air flow downstream side of the heater core 18.

For example, if the ventilation path communication door 25 is opened, the two downstream side ventilation paths 123 and 124 communicate with each other. In this case, the air passing through one or both of the heater core 18 and the upper bypass passage 123a in the first downstream side ventilation path 123 can flow not only to the face blow-out port 12a and the defroster blow-out port 12b but also to the foot blow-out port 12c. The air passing through one or both of the heater core 18 and the lower bypass passage 124a in the second downstream side ventilation path 124 can flow not only to the foot blow-out port 12c but also to the face blow-out port 12a and the defroster blow-out port 12b.

In addition, if the ventilation path communication door 25 is closed, the communication between the two downstream side ventilation paths 123 and 124 is blocked. In this case, the air passing through one or both of the heater core 18 and the upper bypass passage 123a in the first downstream side ventilation path 123 cannot flow to the foot blow-out port 12c. The air passing through one or both of the heater core 18 and the lower bypass passage 124a in the second downstream side ventilation path 124 cannot flow to the face blow-out port 12a and the defroster blow-out port 12b.

As shown in FIGS. 1 and 2, the upstream side guide member 26 is provided on one side in the fan axial direction DRa with respect to the blower fan 201 in the air conditioning case 12. In addition, the upstream side guide member 26 is provided on an air flow downstream side with respect to the first and second upstream side ventilation paths 121 and 122, specifically, on the other side in the fan axial direction DRa. That is, the upstream side guide member 26 is provided on the other side in the fan axial direction DRa with respect to the upstream side partition wall 125 of the air conditioning case 12. The upstream side guide member 26 is fixed to the air conditioning case 12.

The upstream side guide member 26 guides the air flowing out from the first upstream side ventilation path 121 and the second upstream side ventilation path 122 and flowing from one side to the other side in the fan axial direction DRa to the blower fan 201. The guided air is sucked into the blower fan 201 through the fan suction hole 127a.

Figure 5:
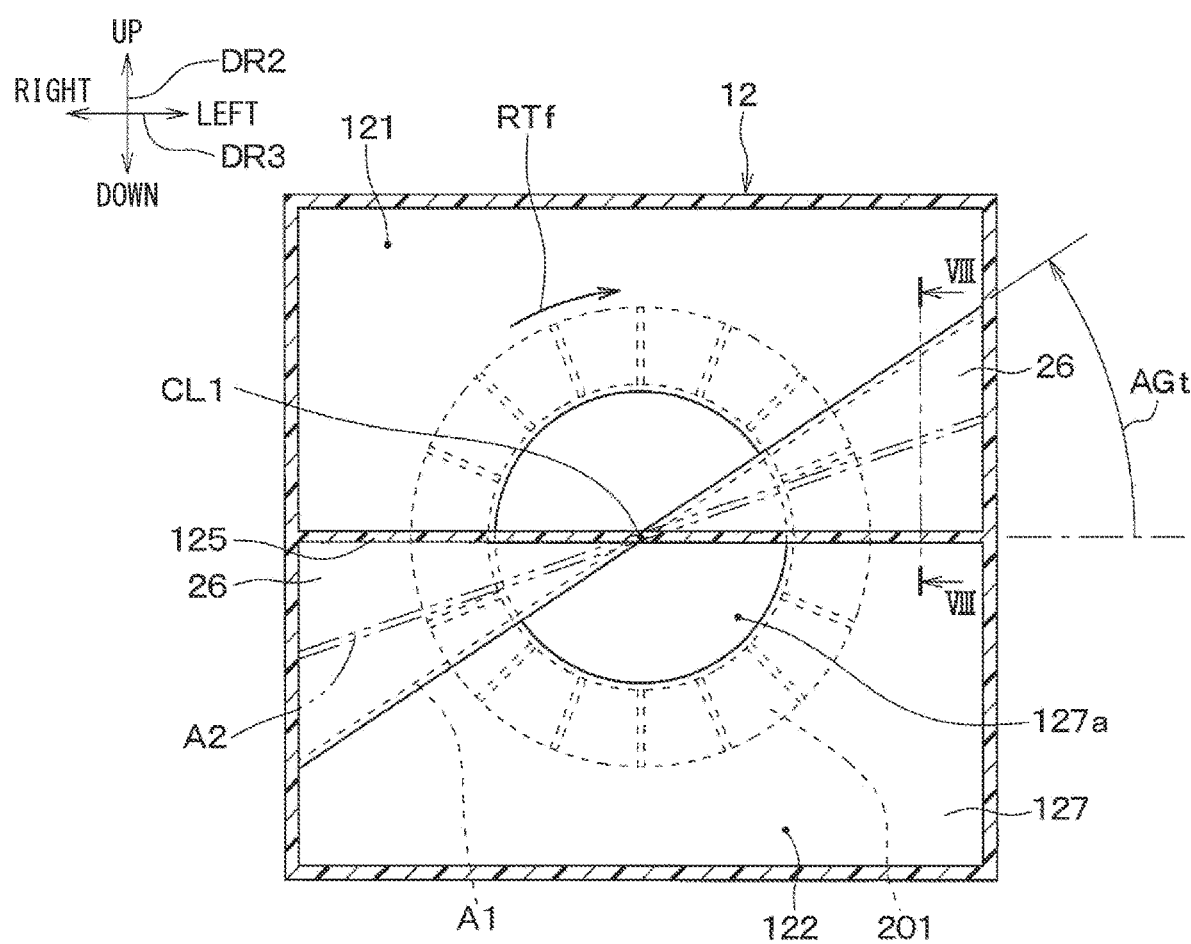
FIG. 5 is a cross-sectional view showing a cross section taken along line V-V of FIG. 1 in the first embodiment.
Figure 6:
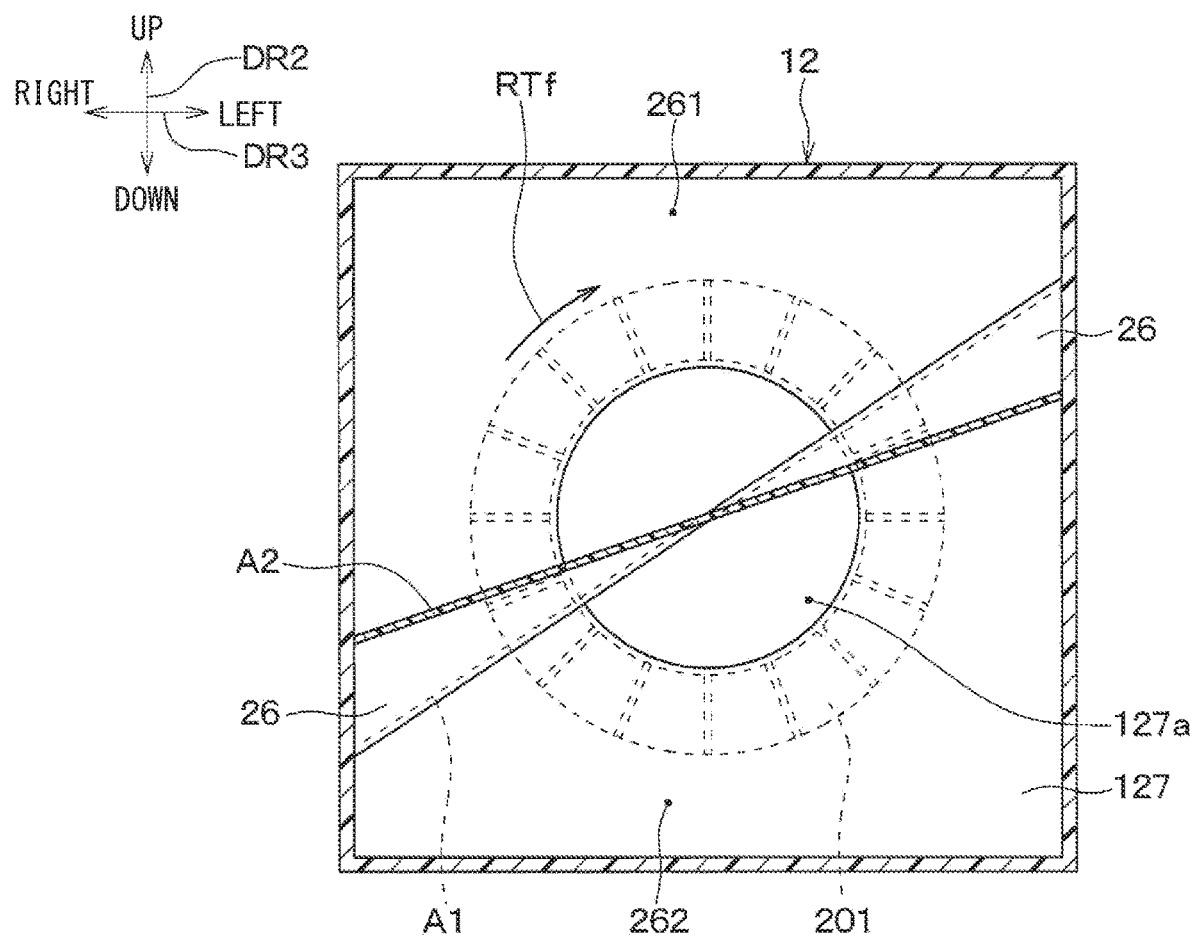
FIG. 6 is a cross-sectional view showing a cross section taken along line VI-VI positioned closer to the other side in a fan axial direction as compared with the cross section taken along line V-V of FIG. 1 in the first embodiment.
Figure 7:
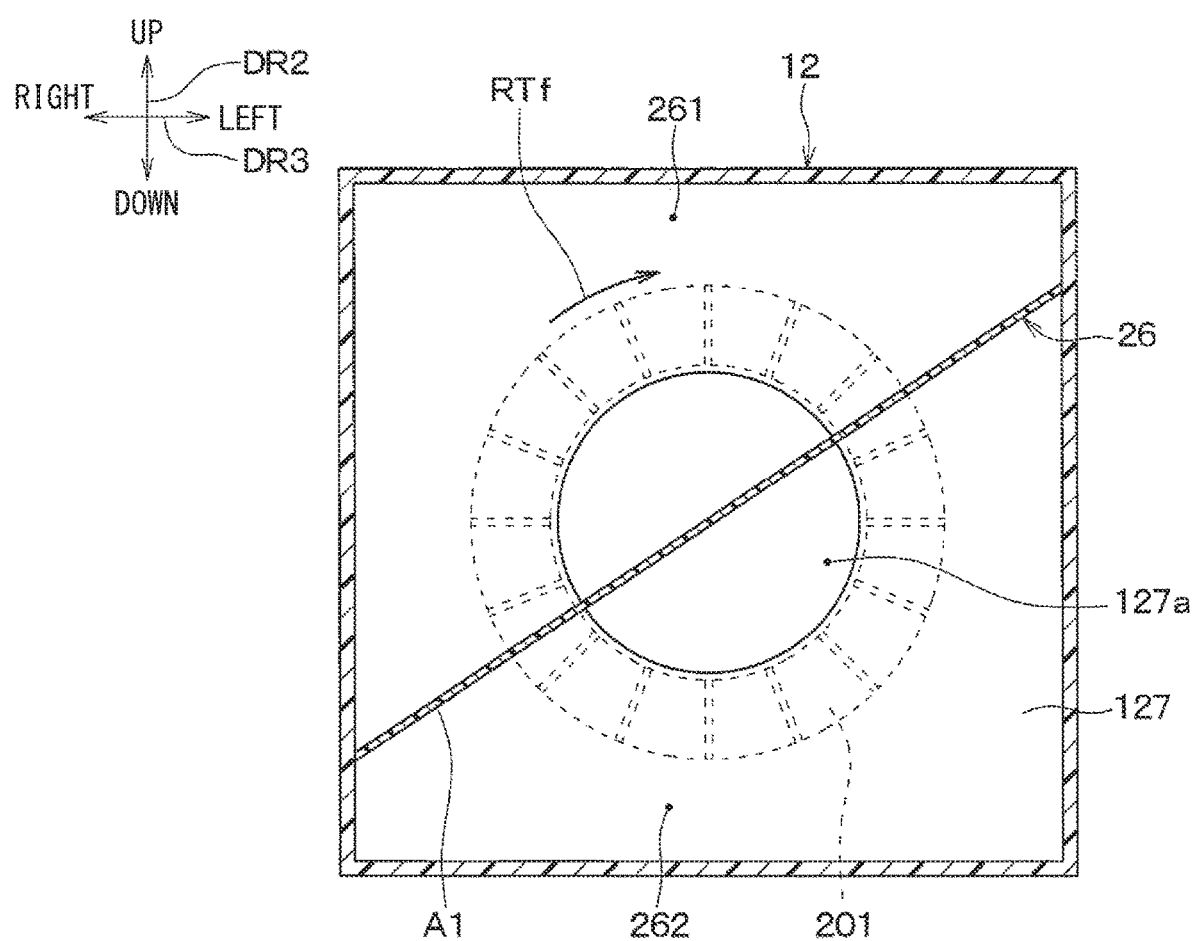
FIG. 7 is a cross-sectional view showing a cross section taken along line VII-VII positioned closer to the other side in the fan axial direction as compared with the cross section taken along line VI-VI of FIG. 1 in the first embodiment.

In addition, as shown in FIGS. 5 to 7, the upstream side guide member 26 is formed of a plate-shaped member having a plate shape twisted centered on the fan axis CL1. In detail, the upstream side guide member 26 has a shape in which the other side of the upstream side guide member 26 in the fan axial direction DRa is twisted around the fan axis CL1 in an opposite direction to the rotation direction RTf of the blower fan 201 with respect to one side.

In addition, the upstream side guide member 26 partitions and divides air passages from the first and second upstream side ventilation paths 121 and 122 to the blower fan 201 into a first upstream side guide passage 261 and a second upstream side guide passage 262 provided in parallel with each other. The upstream side guide member 26 may be formed so as to completely separate the first upstream side guide passage 261 and the second upstream side guide passage 262 from each other, or may permit communication between the first upstream side guide passage 261 and the second upstream side guide passage 262 to some degree.

The first upstream side guide passage 261 is arranged above the second upstream side guide passage 262 with the upstream side guide member 26 interposed therebetween. The air flows from the first upstream side ventilation path 121 into the first upstream side guide passage 261, and the air flows from the second upstream side ventilation path 122 into the second upstream side guide passage 262. The upstream side guide member 26 guides air of a plurality of upstream side guide passages 261 and 262 to the blower fan 201 along the twisted shape of the upstream side guide member 26 described above.

Note that the rotation direction RTf of the blower fan 201 is also referred to as a fan rotation direction RTf. In addition, FIGS. 5 to 7 show cross sections cut by a plane whose normal direction is the fan axial direction DRa. In addition, a portion A1 of the upstream side guide member 26 shown in FIGS. 5 and 6 is the same portion as a cross-sectional portion A1 of the upstream side guide member 26 shown in FIG. 7. In addition, a portion A2 of the upstream side guide member 26 indicated by a two-dot chain line in FIG. 5 is the same portion as a cross-sectional portion A2 of the upstream side guide member 26 shown in FIG. 6.

Due to the twisted shape of the upstream side guide member 26 as described above, the upstream side guide member 26 guides the air flowing along the upstream side guide member 26 so that the air flows in the opposite direction to the fan rotation direction RTf in a circumferential direction of the blower fan 201 as the air proceeds to the other side in the fan axial direction DRa.

For example, the upstream side guide member 26 allows the air of the first upstream side guide passage 261 to flow as indicated by arrows F1a and F1b in FIG. 2. That is, the upstream side guide member 26 allows the air flowing out from the first upstream side ventilation path 121 and flowing along the upstream side guide member 26 to flow in the opposite direction to the fan rotation direction RTf in the circumferential direction of the blower fan 201 as the air proceeds to the other side in the fan axial direction DRa.

At the same time, the upstream side guide member 26 allows the air of the second upstream side guide passage 262 to flow as indicated by arrows F2a and F2b in FIG. 2. That is, the upstream side guide member 26 allows the air flowing out from the second upstream side ventilation path 122 and flowing along the upstream side guide member 26 to flow in the opposite direction to the fan rotation direction RTf in the circumferential direction of the blower fan 201 as the air proceeds to the other side in the fan axial direction DRa.

Note that the arrows F1a and F2a in FIG. 2 indicate an air flow proceeding along a surface of the upstream side guide member 26 on one side of the upstream side guide member 26 in the fan axial direction DRa. The arrows F1b and F2b in FIG. 2 indicate an air flow proceeding along a surface of the upstream side guide member 26 on the other side of the upstream side guide member 26 in the fan axial direction DRa.

Figure 8:
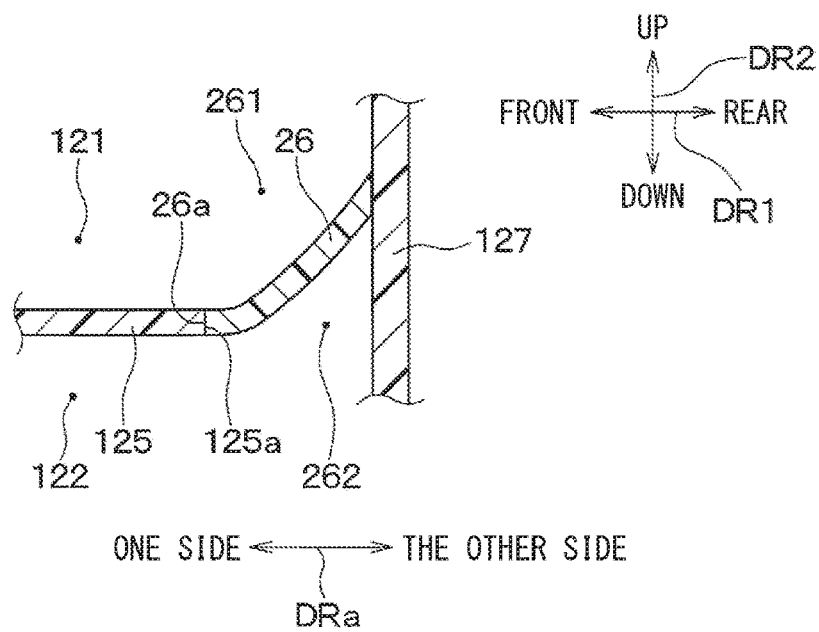
FIG. 8 is a cross-sectional view showing a cross section taken along line VIII-VIII of FIG. 5 in the first embodiment.

As shown in FIGS. 1 and 8, the upstream side partition wall 125 of the air conditioning case 12 has the other end (or may be referred as a first end) 125a on the other side in the fan axial direction DRa. In addition, the upstream side guide member 26 has one end (or may be referred as a second end) 26a on one side in the fan axial direction DRa.

Both of the other end 125a of the upstream side partition wall 125 and one end 26a of the upstream side guide member 26 are formed so as to extend in the width direction DR3 of the vehicle. One end 26a of the upstream side guide member 26 is arranged so as to be aligned with the other end 125a of the upstream side partition wall 125 in the fan axial direction DRa. One end 26a of the upstream side guide member 26 may be separated from the other end 125a of the upstream side partition wall 125 by a slight gap in the fan axial direction DRa, but in the present embodiment, one end 26a of the upstream side guide member 26 is connected to the other end 125a of the upstream side partition wall 125.

Since the upstream side guide member 26 and the upstream side partition wall 125 are connected to each other as described above, the first upstream side guide passage 261 is connected to the first upstream side ventilation path 121 and is separated from the second upstream side ventilation path 122 and the second upstream side guide passage 262. The second upstream side guide passage 262 is connected to the second upstream side ventilation path 122 and is separated from the first upstream side ventilation path 121 and the first upstream side guide passage 261.

In addition, since the upstream side guide member 26 is connected to the upstream side partition wall 125, the upstream side guide member 26 is provided from the other end 125a of the upstream side partition wall 125 to the fan suction hole 127a in the fan axial direction DRa. In the fan axial direction DRa, the upstream side guide member 26 may extend until the other end of the upstream side guide member 26 enters the inside of the blower fan 201 through the fan suction hole 127a or may stay up to the fan suction hole 127a.

As shown in FIGS. 1 and 3, the plurality of downstream side guide members 28 are provided in the air conditioning case 12. The plurality of downstream side guide members 28 are arranged on an air flow downstream side with respect to the blower fan 201 and on an air flow upstream side with respect to the first downstream side ventilation path 123 and the second downstream side ventilation path 124. Note that a schematic outer shape of the blower fan 201 is indicated by a two-dot chain line in FIG. 3, and the same applies to FIGS. 13, 16, and 18 as described later.

Figure 9:
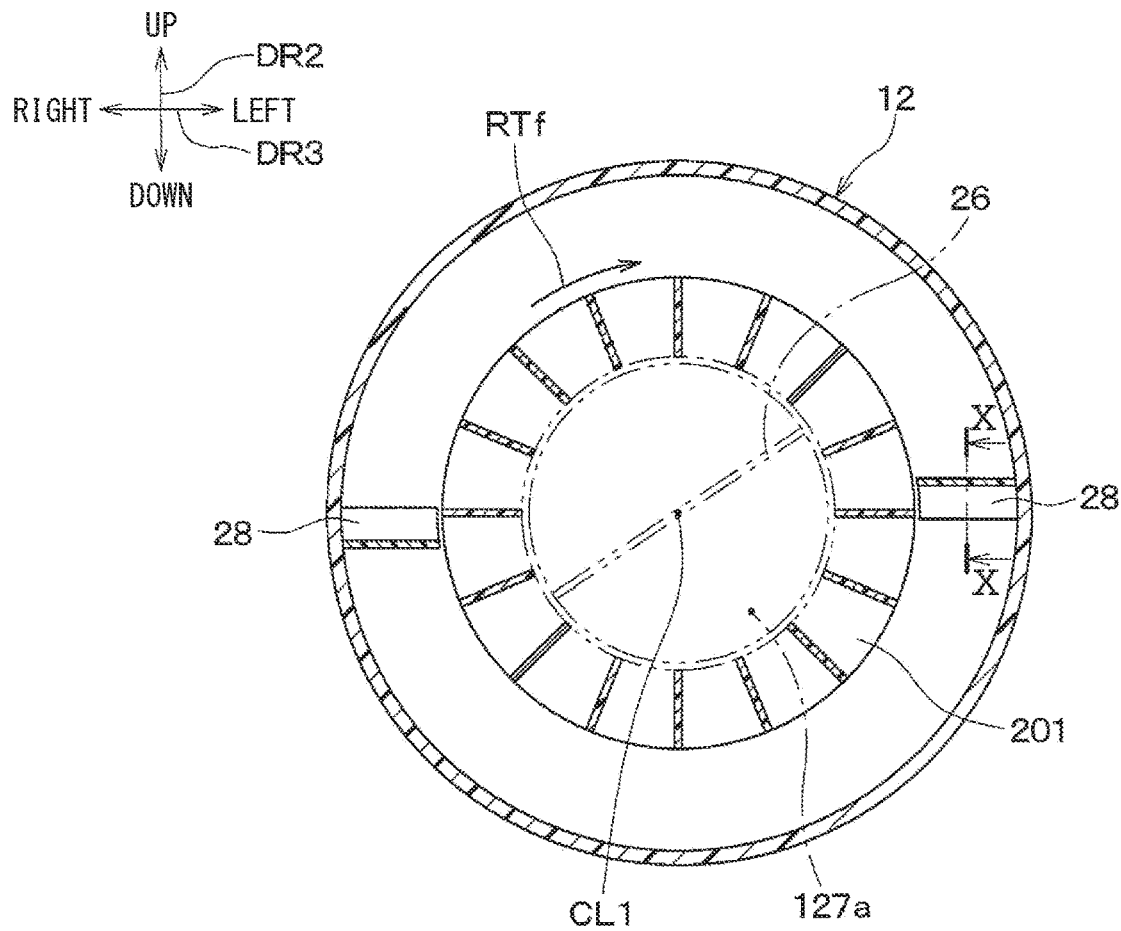
FIG. 9 is a cross-sectional view showing a cross section taken along line IX-IX of FIG. 1 in the first embodiment.

Specifically, as shown in FIGS. 3 and 9, the plurality of downstream side guide members 28 are arranged outside the blower fan 201 in the radial direction and are provided side by side in the circumferential direction of the blower fan 201, respectively. Therefore, the plurality of downstream side guide members 28 are arranged on one side in the fan axial direction DRa with respect to the first downstream side ventilation path 123, the second downstream side ventilation path 124, and the downstream side partition wall 126.

Note that since FIG. 9 shows a cross section taken along line IX-IX of FIG. 1, the fan suction hole 127a and the upstream side guide member 26 are not shown in FIG. 9, but in FIG. 9, fan suction hole 127a and the upstream side guide member 26 are indicated by two-dot chain lines. FIG. 9 is a view showing a relative positional relationship among the fan suction hole 127a, the upstream side guide member 26, and the downstream side guide members 28. The same applies to FIGS. 14, 15, 17, and 19 as described later.

For example, in the present embodiment, two downstream side guide members 28 are provided, and are provided side by side at an equal pitch in the circumferential direction of the blower fan 201. Since the downstream side guide members 28 are fixed to the air conditioning case 12, the downstream side guide members 28 are arranged with a gap in the radial direction from the blower fan 201 so as not to interfere with the blower fan 201 that rotates.

The plurality of downstream side guide members 28 guides the air flowing out from the blower fan 201 to the first downstream side ventilation path 123 and the second downstream side ventilation path 124. Specifically, the air flowing out from the blower fan 201 flows from the inside in the fan radial direction with respect to the downstream side guide members 28 along the downstream side guide members 28. The air guided along the downstream side guide members 28 flows to the other side in the fan axial direction DRa to flow into the first downstream side ventilation path 123 and the second downstream side ventilation path 124, as it proceeds to the outside in the fan radial direction.

In this case, the plurality of downstream side guide members 28 suppress the rotation component given by the rotation of the blower fan 201, of the flow velocity of the air flowing out from the blower fan 201 by allowing the air flowing out from the blower fan 201 to flow along the downstream side guide members 28.

Figure 10:
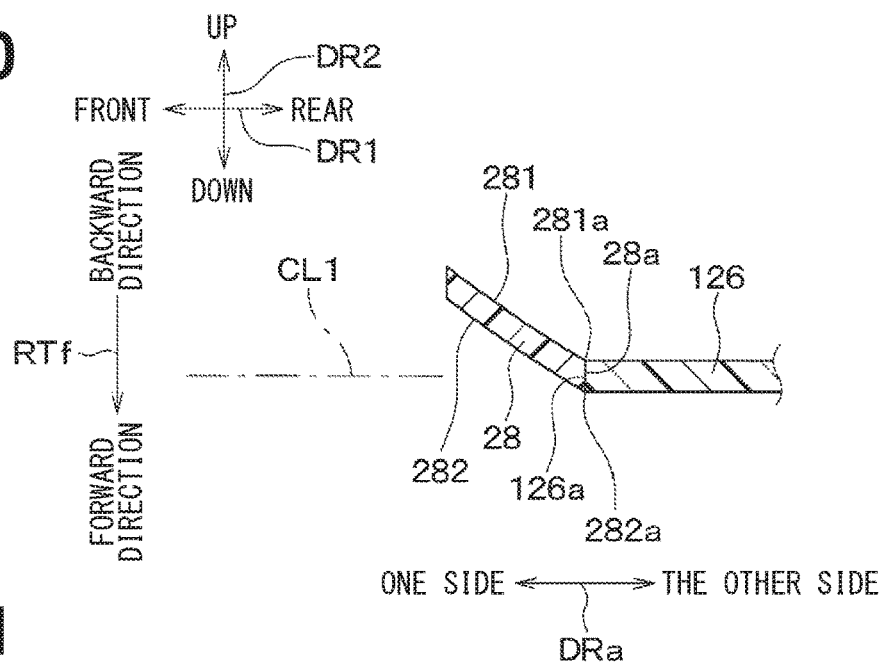
FIG. 10 is a cross-sectional view showing a cross section taken along line X-X of FIG. 9 in the first embodiment.

Specifically, as shown in FIGS. 3, 9, and 10, each of the plurality of downstream side guide members 28 has a plate shape intersecting the circumferential direction of the blower fan 201. In addition, the downstream side guide member 28 has a first guide surface 281 provided on one surface side of the plate shape and a second guide surface 282 provided on the other surface side of the plate shape.

The first guide surface 281 is a surface that faces to be opposite to the fan rotation direction RTf in the circumferential direction of the blower fan 201, of the two guide surfaces 281 and 282. Conversely, the second guide surface 282 is a surface facing an opposite side to the side facing the fan rotation direction RTf in the circumferential direction of the blower fan 201, of the two guide surfaces 281 and 282.

In detail, the downstream side guide member 28 suppresses the rotation component of the flow velocity of the air flowing out from the blower fan 201 by allowing the air flowing out from the blower fan 201 to flow along the first guide surface 281. That is, the first guide surface 281 of the downstream side guide member 28 acts so as to prevent permitting the air flowing out from the blower fan 201 from flowing in the circumferential direction of the blower fan 201 while permitting the air flowing out from the blower fan 201 to flow to the outside in the fan radial direction.

In addition, each of the plurality of downstream side guide members 28 has the other end 28a on the other side in the fan axial direction DRa. Therefore, the first guide surface 281 also has the other end 281a on the other side in the fan axial direction DRa, and the second guide surface 282 also has the other end 282a on the other side in the fan axial direction DRa. The other end 281a of the first guide surface 281 and the other end 282a of the second guide surface 282 are included in the other end 28a of the downstream side guide member 28.

In addition, since the air flowing along the respective guide surfaces 281 and 282 flows to the downstream side ventilation path 123 and 124 in the fan axial direction DRa with respect to the downstream side guide members 28, the other end 281a of the first guide surface 281 is a downstream end of an air flow along the first guide surface 281. The other end 282a of the second guide surface 282 is a downstream end of an air flow along the second guide surface 282.

In addition, as shown in FIGS. 3 and 10, the first guide surface 281 and the second guide surface 282 are inclined with respect to the fan axis CL1 so as to be positioned on a forward side in the fan rotation direction RTf toward the other side in the fan axial direction DRa.

As shown in FIGS. 1 and 10, the downstream side partition wall 126 of the air conditioning case 12 has one end 126a on one side in the fan axial direction DRa. Both of one end 126a of the downstream side partition wall 126 and the other end 28a of the downstream side guide member 28 are formed so as to extend in the width direction DR3 of the vehicle. All of the other ends 28a of the plurality of downstream side guide members 28 are aligned with one end 126a of the downstream side partition wall 126 in the fan axial direction DRa. The other ends 28a of the downstream side guide member 28 may be separated from one end 126a of the downstream side partition wall 126 by a slight gap in the fan axial direction DRa, but in the present embodiment, both of the other ends 28a of the downstream side guide members 28 are connected to one end 126a of the downstream side partition wall 126.

Next, an operation of the air-conditioning unit 10 for vehicles will be described. The air-conditioning unit 10 for vehicles is switched in and operated in any one of a plurality of predetermined operation modes. For example, a case where the air-conditioning unit 10 for vehicles is operated in an inside/outside air two-layer mode in which inside air that is air inside the vehicle and outside air that is air outside the vehicle flow separately will be described.

In the inside/outside air two-layer mode, the ventilation path communication door 25 is closed as shown in FIG. 1. When the blower 20 is activated, the outside air is introduced into the first upstream side ventilation path 121 as indicated by an arrow FA1, and the inside air is introduced into the second upstream side ventilation path 122 as indicated by an arrow FB1.

The outside air flowing through the first upstream side ventilation path 121 passes through the filter 13, and is then guided to the upstream side guide member 26 and sucked into the blower fan 201. The outside air sucked into the blower fan 201 is blown out from the blower fan 201, is guided to the downstream side guide member 28, and flows into the first downstream side ventilation path 123 as indicated by an arrow FA2.

In addition, the inside air flowing through the second upstream side ventilation path 122 passes through the filter 13, and is then guided to the upstream side guide member 26 and sucked into the blower fan 201. The inside air sucked into the blower fan 201 is blown out from the blower fan 201, is guided to the downstream side guide member 28, and flows into the second downstream side ventilation path 124 as indicated by an arrow FB2.

In this case, the outside air flowing out of the first upstream side ventilation path 121 is guided to the respective guide members 26 and 28, such that the outside air hardly flows into the second downstream side ventilation path 124 and flows exclusively to the first downstream side ventilation path 123. At the same time, the inside air flowing out of the second upstream side ventilation path 122 is guided to the respective guide members 26 and 28, such that the inside air hardly flows into the first downstream side ventilation path 123 and flows exclusively to the second downstream side ventilation path 124. Therefore, the outside air flowing from the first upstream side ventilation path 121 to the first downstream side ventilation path 123 and the inside air flowing from the second upstream side ventilation path 122 to the second downstream side ventilation path 124 are guided to the respective guide members 26 and 28, such that the outside air and the inside air flow respectively without being substantially mixed with each other.

The outside air flowing through the first downstream side ventilation path 123 passes through the evaporator 16, and then passes through each or one of the heater core 18 and the upper bypass passage 123a. The air passing through each or one of the heater core 18 and the upper bypass passage 123a is blown out from the opened blow-out port of the face blow-out port 12a and the defroster blow-out port 12b to a predetermined place in the vehicle interior as indicated by arrows FA3 and FA4.

In addition, the inside air flowing through the second downstream side ventilation path 124 passes through the evaporator 16, and then passes through each or one of the heater core 18 and the lower bypass passage 124a. The air passing through each or one of the heater core 18 and the lower bypass passage 124a is blown out from the foot blow-out port 12c to a predetermined place in the vehicle interior as indicated by an arrow FB3.

As described above, according to the present embodiment, as shown in FIGS. 1, 2, and 5, the upstream side guide member 26 has the shape in which the other side of the upstream side guide member 26 in the fan axial direction DRa is twisted around the fan axis CL1 in the opposite direction to the fan rotation direction RTf with respect to one side. The upstream side guide member 26 guides the air to the blower fan 201 along the twisted shape of the upstream side guide member 26.

Thus, the respective air flows flowing out from the first and second upstream side ventilation paths 121 and 122 are rotated in the opposite direction to the fan rotation direction RTf in advance, and then flow into the blower fan 201. This acts in a direction in which a phase shift around the fan axis CL1 generated due to the rotation of the blower fan 201 in a mutual arrangement of a plurality of air flows flowing from the first and second upstream side ventilation paths 121 and 122 to the first and second downstream side ventilation paths 123 and 124 is canceled. Therefore, it is possible to suppress the phase shift.

In addition, according to the present embodiment, as shown in FIGS. 1, 3, and 9, the plurality of downstream side guide members 28 allow the air flowing out from the blower fan 201 to flow along the downstream side guide members 28. Thus, the plurality of downstream side guide members 28 suppress the rotation component given by the rotation of the blower fan 201, of the flow velocity of the air flowing out from the blower fan 201.

Therefore, as compared with a case where the downstream side guide members 28 are not provided, it becomes difficult for the air flowing out from the blower fan 201 to proceed in the fan rotation direction RTf before flowing into the first and second downstream side ventilation paths 123 and 124. For that reason, it is possible to suppress the phase shift around the fan axis CL1 generated due to the rotation of the blower fan 201 in the mutual arrangement of the plurality of air flows flowing from the first and second upstream side ventilation paths 121 and 122 to the first and second downstream side ventilation paths 123 and 124.

As such, by adjusting the phase shift by the upstream side guide member 26 and the downstream side guide members 28, it is possible to allow the plurality of air flows to flow from the blower 20 in any predetermined direction while suppressing the mixing of the plurality of air flows. For example, in the present embodiment, the phase shift is adjusted to be substantially zero.

In addition, it is possible to smoothly guide the air flow in which the phase shift is adjusted whichever of the upstream side guide member 26 and the downstream side guide member 28 is used.

Here, when a blow-out mode is a foot/defroster mode in the inside/outside air two-layer mode, the outside air flows from the first upstream side ventilation path 121 to the first downstream side ventilation path 123 in order to prevent window fogging. At the same time, the inside air flows from the second upstream side ventilation path 122 to the second downstream side ventilation path 124 in order to reduce ventilation loss. Therefore, normally, in a case where a use mode of the air-conditioning unit 10 for vehicles is the inside/outside air two-layer mode and the foot/defroster mode, separability of the plurality of air flows flowing from the upstream side ventilation paths 121 and 122 to the downstream side ventilation paths 123 and 124 is most required.

In the present embodiment, a total phase adjustment angle by the upstream side guide member 26 and the downstream side guide member 28 is calculated from a relationship between a fan rotational frequency and an air volume at an operating point in the use mode in which the separability of the plurality of air flows is most required. The total phase adjustment angle is an angle obtained by adding up an upstream side phase adjustment angle by the upstream side guide member 26 and a downstream side phase adjustment angle by the downstream side guide member 28. The upstream side phase adjustment angle is an angle by which the upstream side guide member 26 reduces the phase shift around the fan axis CL1 generated in the mutual arrangement of the plurality of air flows. The downstream side phase adjustment angle is an angle by which the downstream side guide member 28 reduces the phase shift around the fan axis CL1.

For example, the total phase adjustment angle is determined on the basis of a phase shift amount due to the rotation of the blower fan obtained from the relationship between the fan rotational frequency and the air volume at the operating point in the use mode, and the upstream side phase adjustment angle and the downstream phase adjustment angle are determined from the total phase adjustment angle. In this case, since an influence on pressure loss is larger on an outlet side of the blower fan 201 than on an inlet side of the blower fan 201, the upstream side phase adjustment angle is determined to be larger than the downstream side phase adjustment angle in terms of reduction of the pressure loss.

For example, a twist angle AGt of FIG. 5 in the twisted shape of the upstream side guide member 26 is determined on the basis of the upstream side phase adjustment angle. In addition, a shape of the downstream side guide member 28 such as, for example, an inclination with respect to the fan axis CL1, or the like, is determined on the basis of the downstream side phase adjustment angle.

In addition, in the present embodiment, as shown in FIG. 1, the phase shift is suppressed by both of the upstream side guide member 26 and the downstream side guide member 28, and a sudden change in the ventilation paths is thus suppressed as compared with a case in which the phase shift is suppressed by only any one of the upstream side guide member 26 and the downstream side guide member 28. As a result, it is possible to suppress an increase in the pressure loss of the air flow due to the suppression of the phase shift.

In addition, the upstream side guide member 26 and the downstream side guide member 28 are fixed to the air conditioning case 12. That is, an actuator for operating the upstream side guide member 26 or the downstream side guide member 28 is not provided. Therefore, a space occupied by the actuator can be reduced, and a size of the air-conditioning unit 10 for vehicles in the front and rear direction DR1 of the vehicle can be suppressed.

In addition, since both of the upstream side guide member 26 and the downstream side guide member 28 are fixed to the air conditioning case 12, it is easy to improve sealability between each of the upstream side guide member 26 and the downstream side guide member 28 and the air conditioning case 12. For that reason, it is possible to improve the separability of the plurality of air flows guided to the upstream side guide member 26 and the downstream side guide member 28.

In addition, according to the present embodiment, as shown in FIGS. 1 and 8, the upstream side partition wall 125 is arranged between the first upstream side ventilation path 121 and the second upstream side ventilation path 122, and partitions between the first upstream side ventilation path 121 and the second upstream side ventilation path 122. One end 26a of the upstream side guide member 26 is arranged so as to be aligned with the other end 125a of the upstream side partition wall 125 in the fan axial direction DRa. In detail, the upstream side guide member 26 is connected to the upstream side partition wall 125. Therefore, in a process until the air flowing out from the first and second upstream side ventilation paths 121 and 122 is guided to the upstream side guide member 26, it becomes easy to suppress the air from the first upstream side ventilation path 121 and the air from the second upstream side ventilation path 122 from being mixed with each other.

In addition, according to the present embodiment, as shown in FIGS. 1 and 3, the blower fan 201 is the centrifugal fan. The plurality of downstream side guide members 28 are arranged outside the blower fan 201 in the radial direction and are arranged side by side in the circumferential direction of the blower fan 201. Therefore, it is possible to suppress the air conditioning case 12 from becoming longer in the fan axial direction DRa due to the provision of the downstream side guide members 28 in the air conditioning case 12.

In addition, according to the present embodiment, as shown in FIGS. 3, 9, and 10, the plurality of downstream side guide members 28 have the first guide surfaces 281 facing the side facing the fan rotation direction RTf in the circumferential direction of the blower fan 201. The downstream side guide member 28 suppresses the rotation component of the flow velocity of the air flowing out from the blower fan 201 by allowing the air flowing out from the blower fan 201 to flow along the first guide surface 281. In addition, the other end 281a of the first guide surface 281 is a downstream end of an air flow along the first guide surface 281. Further, the first guide surface 281 is inclined with respect to the fan axis CL1 so as to be positioned on the forward direction side in the fan rotation direction RTf toward the other side in the fan axial direction DRa.

Therefore, it is possible to gently suppress the rotation component included in the air flow flowing out from the blower fan 201. For example, the flow velocity of the air flow is high on the outlet side of the blower fan 201, but if a direction of the air flow of such a high flow velocity turns to the opposite direction to the fan rotation direction RTf, a large pressure loss occurs in the air flow. In this regard, if the first guide surface 281 is inclined with respect to the fan axis CL1 described above, the direction of the air flow flowing out from the blower fan 201 does not turn to the opposite direction to the fan rotation direction RTf, and it is thus possible to avoid occurrence of such a large pressure loss.

In addition, according to the present embodiment, as shown in FIGS. 1 and 10, the downstream side partition wall 126 is arranged between the first downstream side ventilation path 123 and the second downstream side ventilation path 124, and partitions between the first downstream side ventilation path 123 and the second downstream side ventilation path 124. All of the other ends 28a of the plurality of downstream side guide members 28 are arranged so as to be aligned with one end 126a of the downstream side partition wall 126 in the fan axial direction DRa. In detail, all of the plurality of downstream side guide members 28 are connected to the downstream side partition wall 126. Therefore, before the air guided to the downstream side guide members 28 flows into the first and second downstream side ventilation paths 123 and 124, it becomes easy to suppress the air flowing into the first downstream side ventilation path 123 and the air flowing into the second downstream side ventilation path 124 from being mixed with each other.

Second Embodiment

Next, a second embodiment will be described. In the present embodiment, portions different from those of the first embodiment described above will be mainly described. In addition, a description for the same or equivalent parts as those of the embodiment described above will be omitted or simplified. The same applies to a description of embodiments as described later.

Figure 11:
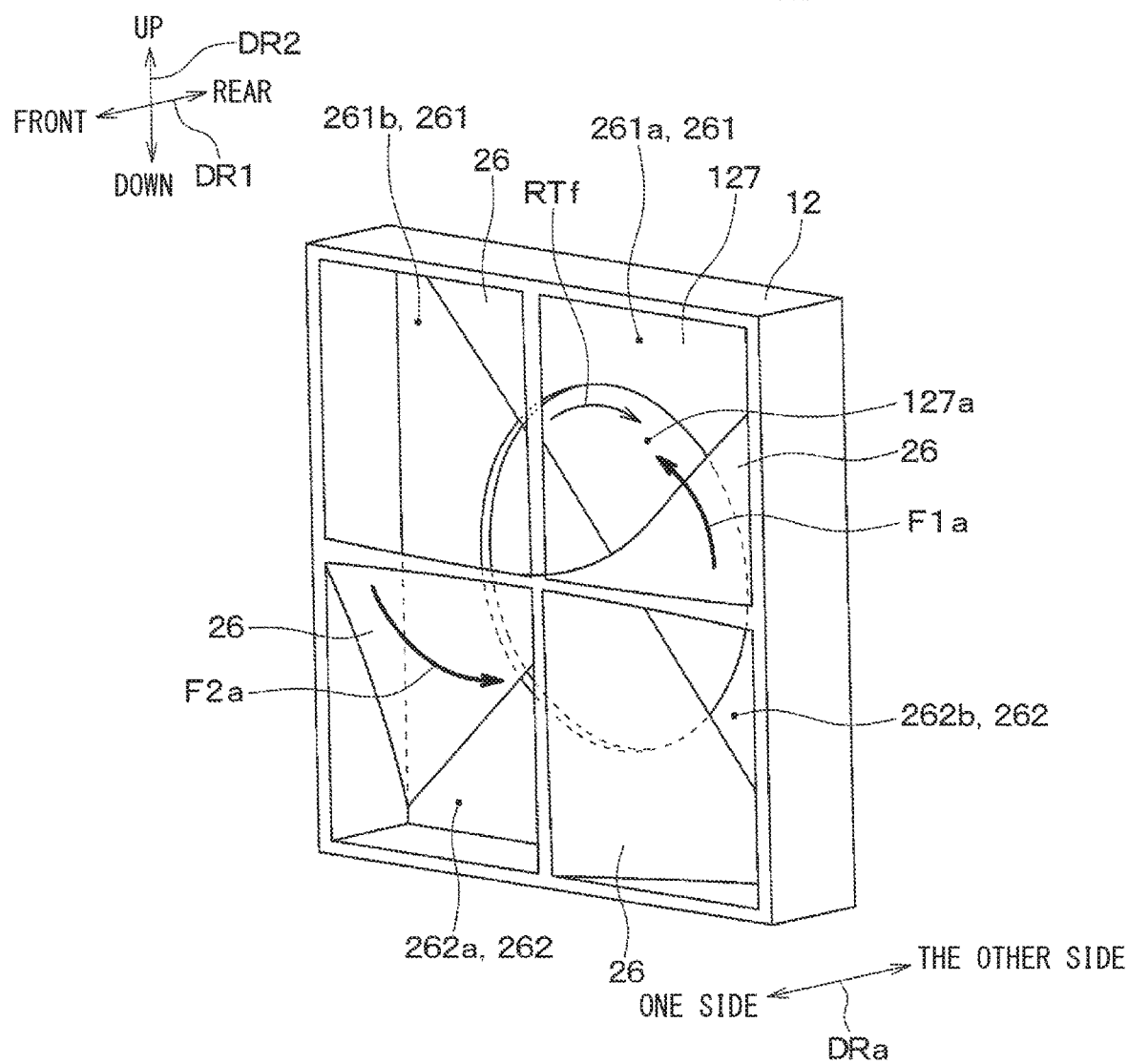
FIG. 11 is a perspective view extracting and showing an upstream side guide member and peripheral portions thereof in a second embodiment, and is a view corresponding to FIG. 2.

As shown in FIG. 11, an upstream side guide member 26 of the present embodiment has two plate shapes of FIG. 2 twisted centered on a fan axis CL1, and the two plate shapes intersect each other and are coupled to each other. Therefore, in the present embodiment, the upstream side guide member 26 partitions and divides a first upstream side guide passage 261 into two upstream side guide passages 261a and 261b provided in parallel with each other. The upstream side guide member 26 partitions and divides a second upstream side guide passage 262 into two upstream side guide passages 262a and 262b provided in parallel with each other. The upstream side guide member 26 may be formed so as to completely separate a plurality of upstream side guide passages 261a, 261b, 262a, and 262b from each other or may be may permit communication between the plurality of upstream side guide passages 261a, 261b, 262a, and 262b to some degree.

A total number of upstream side guide passages 261a, 261b, 262a, and 262b of the present embodiment formed as described above is four. On the other hand, a total number of upstream side ventilation paths 121 and 122 provided in an air conditioning case 12 is two. Therefore, in the present embodiment, the number of a plurality of upstream side guide passages 261a, 261b, 262a, and 262b is larger than that of a plurality of upstream side ventilation paths 121 and 122.

Thus, for example, as compared with a case where the number of the plurality of upstream side guide passages is the same as that of the plurality of upstream side ventilation paths, it becomes easy to rotate all air flows flowing out from the plurality of upstream side ventilation paths 121 and 122 around the fan axis CL1 according to the twisted shape of the upstream side guide member 26.

The present embodiment is the same as the first embodiment except for those described above. In the present embodiment, effects achieved from a configuration common to the first embodiment described above can be obtained, similar to the first embodiment.

Third Embodiment

Next, a third embodiment will be described. In the present embodiment, portions different from those of the first embodiment described above will be mainly described.

Figure 12:
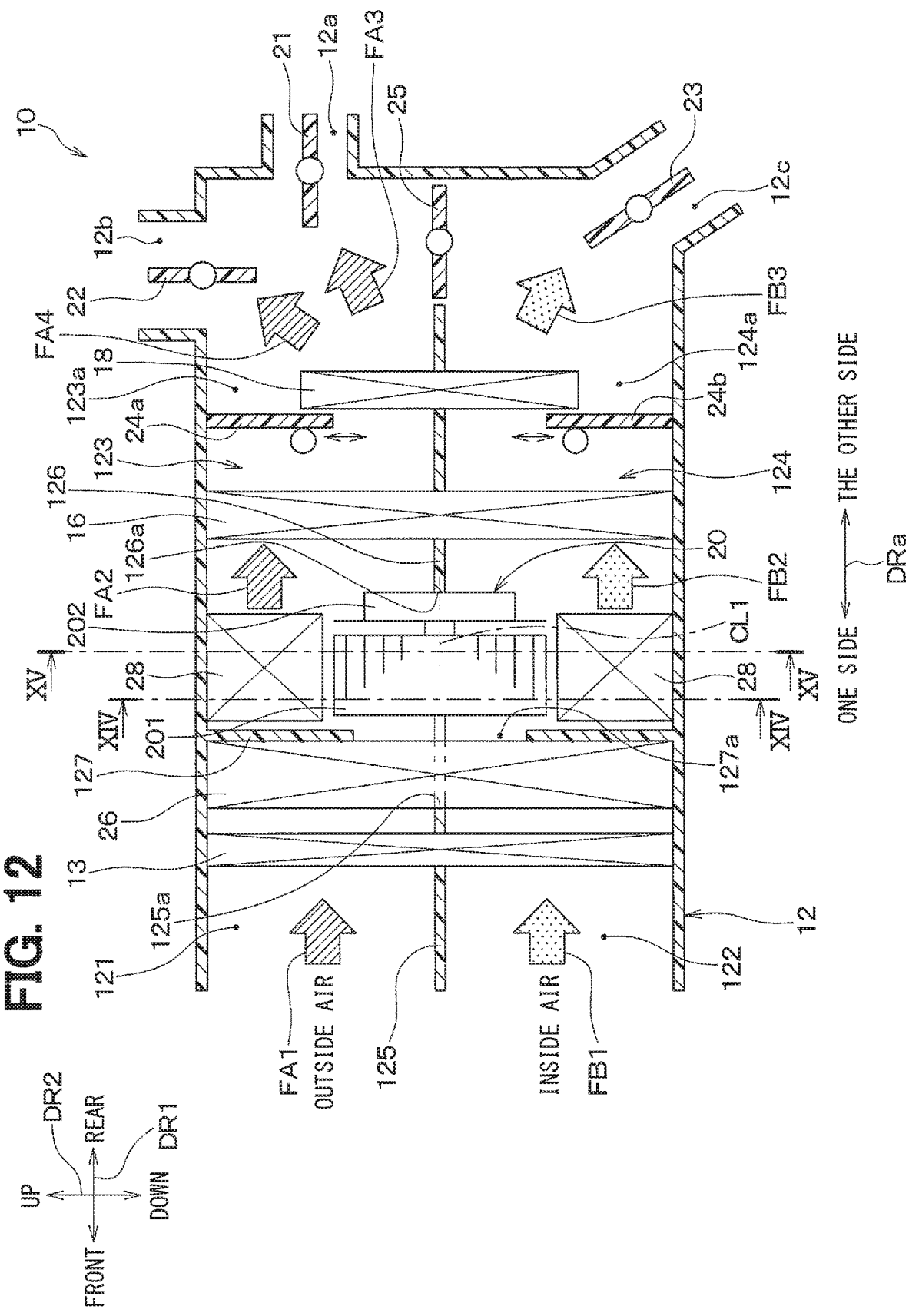
FIG. 12 is a schematic cross-sectional view showing a schematic configuration of an air-conditioning unit for vehicles in a third embodiment, and is a view showing a position of a cross section taken along line XIV-XIV and a position of a cross section taken along line XV-XV in the same cross-sectional view as FIG. 1.
Figure 13:
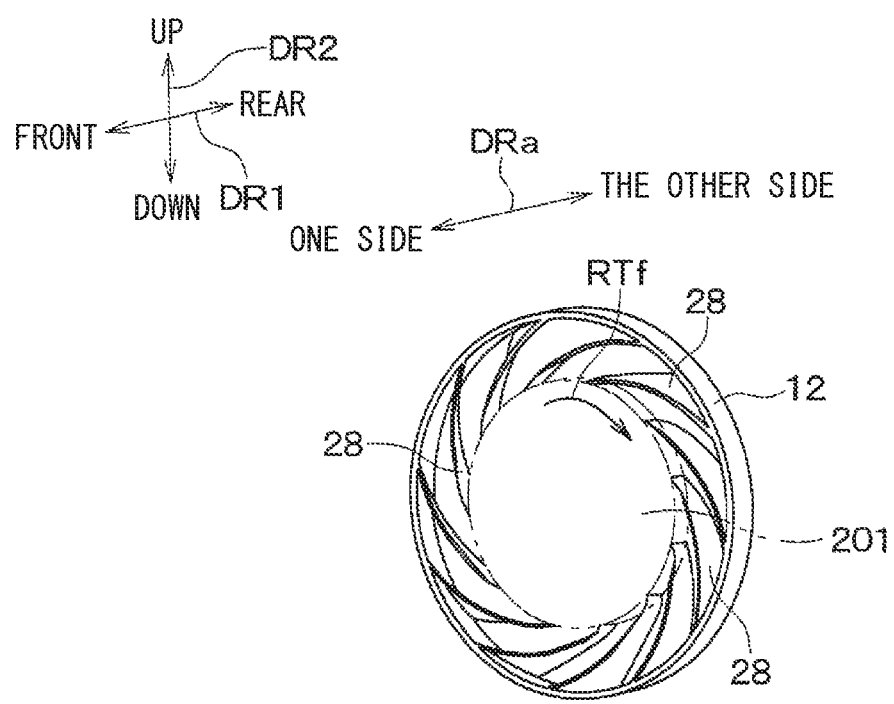
FIG. 13 is a perspective view extracting and showing a downstream side guide member and peripheral portions thereof in the third embodiment, and is a view corresponding to FIG. 3.
Figure 14:
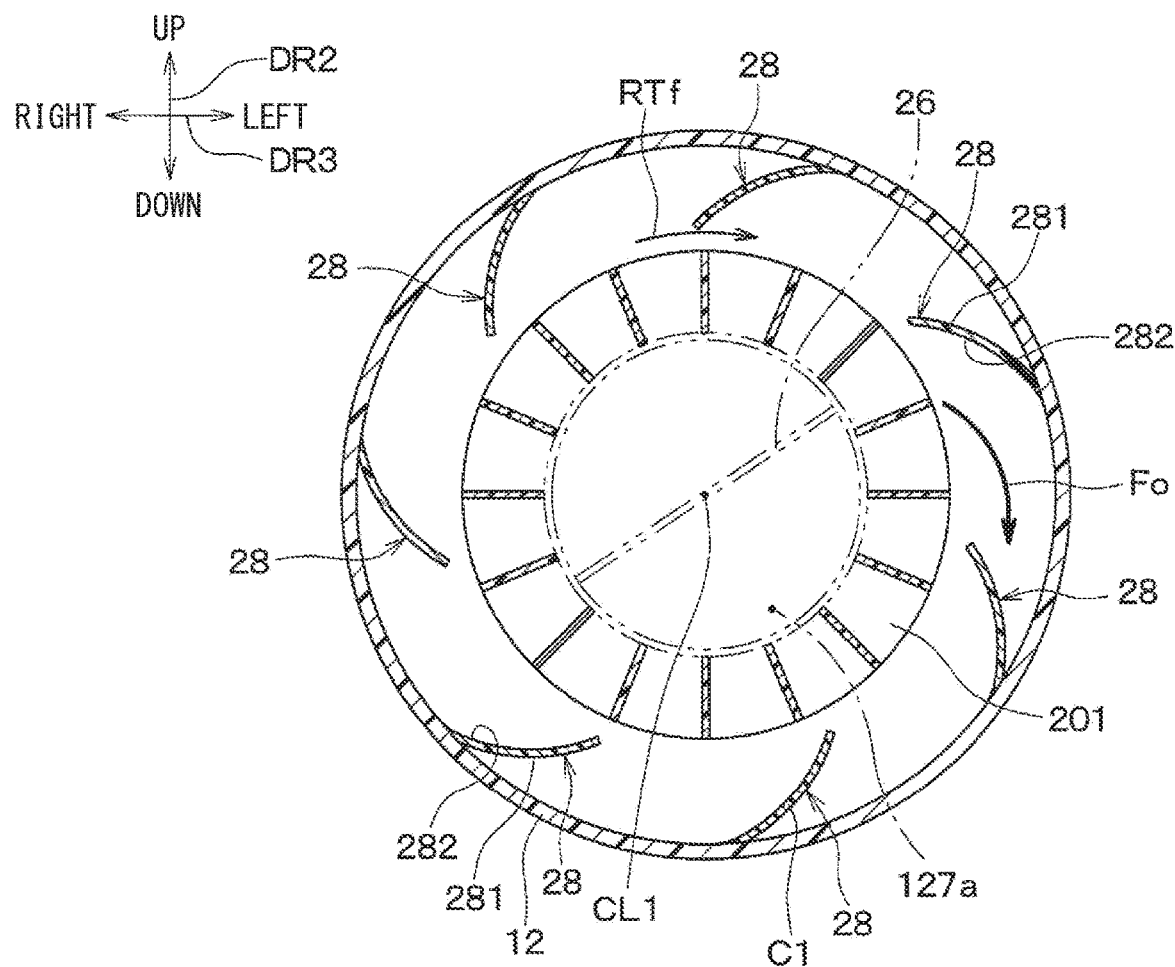
FIG. 14 is a cross-sectional view showing a cross section taken along line XIV-XIV of FIG. 12 in the third embodiment, and is a view corresponding to FIG. 9.

As shown in FIGS. 12 to 14, in the present embodiment, downstream side guide members 28 are arranged outside a blower fan 201 in a radial direction and have a plate shape provided so as to intersect a circumferential direction of the blower fan 201, similar to the first embodiment. Therefore, the downstream side guide member 28 of the present embodiment has a first guide surface 281 and a second guide surface 282, similar to the first embodiment. However, in the present embodiment, the number of downstream side guide members 28 is larger than that in the first embodiment and a shape of each of the downstream side guide members 28 is different than that in the first embodiment.

Figure 15:
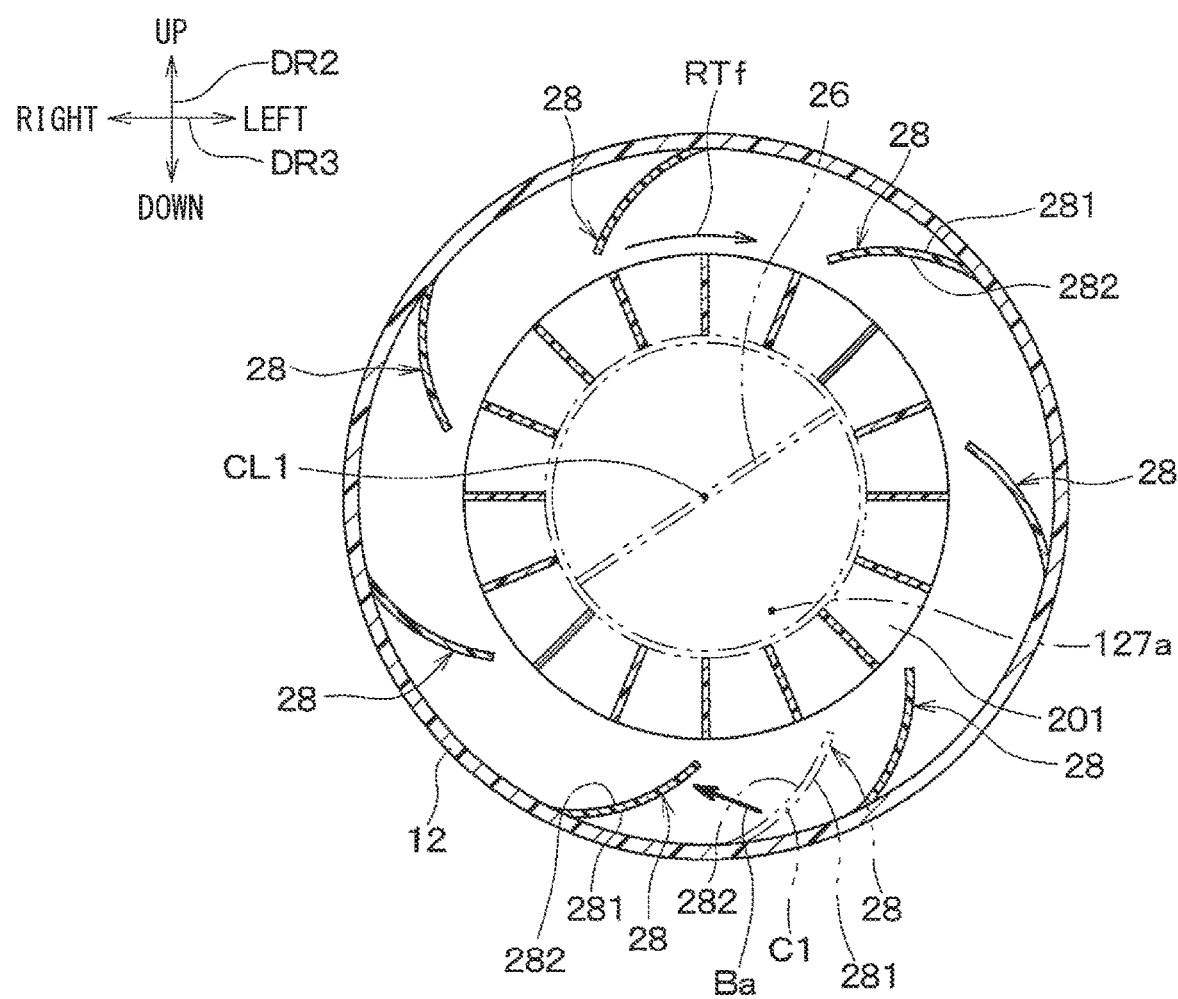
FIG. 15 is a cross-sectional view showing a cross section taken along line XV-XV positioned closer to the other side in a fan axial direction as compared with the cross section taken along line XIV-XIV of FIG. 12 in the third embodiment.

Specifically, as shown in FIGS. 13 to 15, each of a plurality of downstream side guide members 28 is curved to be positioned on a forward side of a fan rotation direction RTf toward the outside in a fan radial direction. The shape of the downstream side guide member 28 is a curved shape with the first guide surface 281 as a convex surface and the second guide surface 282 as a concave surface. An arrow Fo in FIG. 14 indicates an air flow blown out from the blower fan 201 and guided along the downstream side guide member 28.

In addition, a shape of the downstream side guide member 28 in a fan axial direction DRa is as follows. In addition, as shown in FIGS. 14 and 15, each of the downstream side guide members 28 having the plate shape are inclined with respect to the fan axis CL1 so as to be positioned on the forward direction side in the fan rotation direction RTf toward the other side in the fan axial direction DRa. In other words, each of the first guide surface 281 and the second guide surface 282 is inclined with respect to the fan axis CL1 so as to be positioned on the forward direction side in the fan rotation direction RTf toward the other side in the fan axial direction DRa. In this respect, the downstream side guide member 28 of the present embodiment is similar to that of the first embodiment.

Note that a portion C1 of the downstream side guide member 28 indicated by a two-dot chain line in FIG. 15 is the same portion as a cross-sectional portion C1 of the downstream side guide member 28 shown in FIG. 14. Therefore, as shown in FIGS. 12, 14, and 15, as a cross-sectional position at which the downstream side guide member 28 is cut is shifted to the other side in the fan axial direction DRa, a cross-sectional portion of the cut downstream side guide member 28 is shifted to the forward direction side in the fan rotation direction RTf, as indicated by an arrow Ba.

The present embodiment is the same as the first embodiment except for those described above. In the present embodiment, effects achieved from a configuration common to the first embodiment described above can be obtained, similar to the first embodiment.

In addition, according to the present embodiment, as shown in FIGS. 13 to 15, each of the plurality of downstream side guide members 28 has the plate shape provided so as to intersect the circumferential direction of the blower fan 201. Each of the plurality of downstream side guide members 28 is bent so as to be positioned on the forward direction side in the fan rotation direction RTf toward the outside in the fan radial direction. Therefore, as the air flowing out from the blower fan 201 moves toward the outside in the fan radial direction, it is possible to gently decrease a rotation component included in a flow velocity of the air.

In addition, according to the present embodiment, a large number of downstream side guide members 28 guiding the air flow and the plate shape are provided radially. Therefore, it is possible to allow the downstream side guide members 28 to have a rectifying effect of reducing a deviation of a mass flow rate of the air. More specifically, the rectifying effect is an effect of suppressing an increase in a variation in the mass flow rate due to the fact that the mass flow rate of the air becomes high near the downstream side guide members 28. By allowing the downstream side guide members 28 to have such a rectifying effect, it is possible to achieve space saving and low pressure loss.

Note that the present embodiment is a modification based on the first embodiment, but it is possible to combine the present embodiment with the second embodiment described above.

Fourth Embodiment

Next, a fourth embodiment will be described. In the present embodiment, portions different from those of the first embodiment described above will be mainly described.

Figure 16:
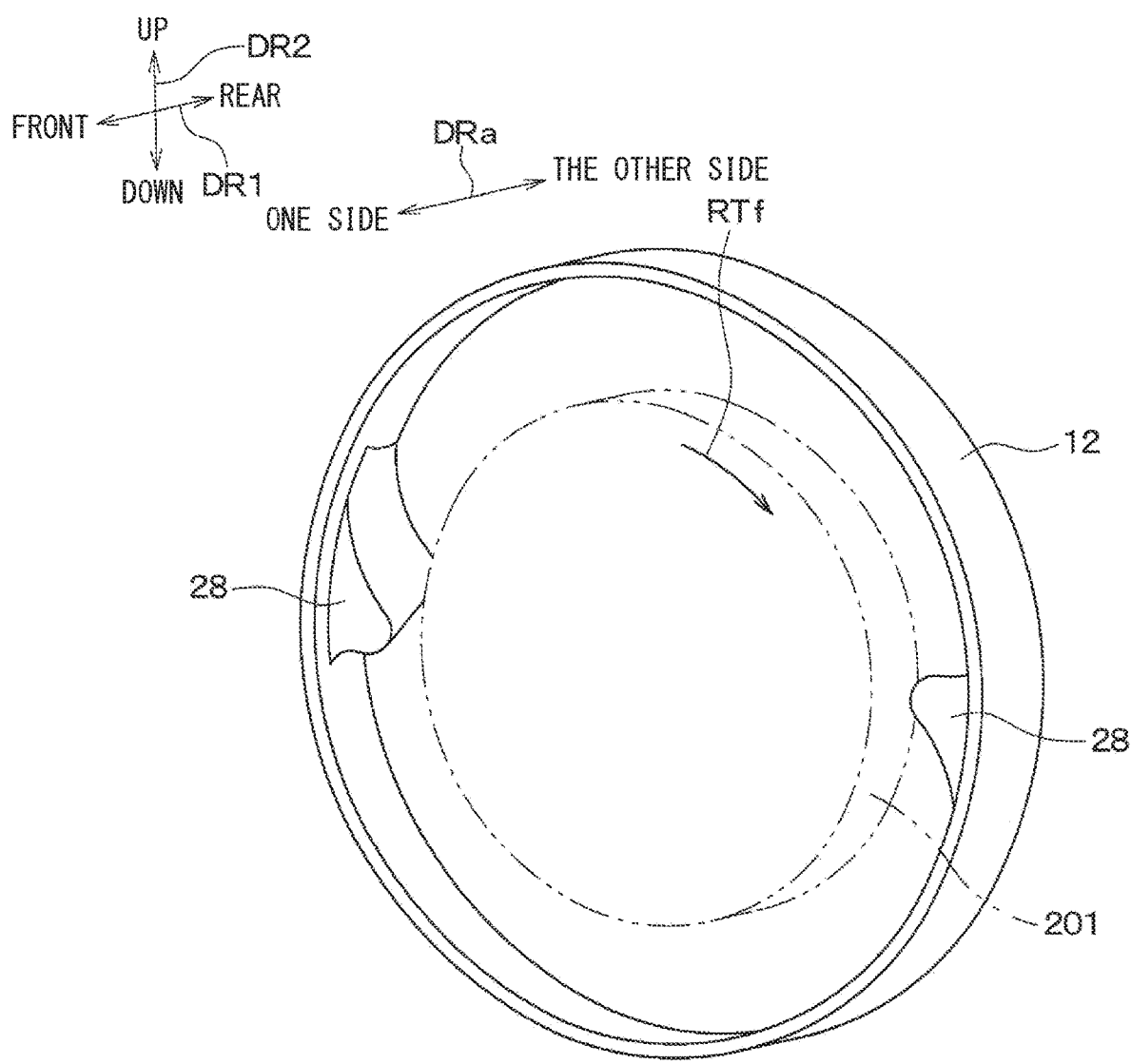
FIG. 16 is a perspective view extracting and showing a downstream side guide member and peripheral portions thereof in a fourth embodiment, and is a view corresponding to FIG. 3.
Figure 17:
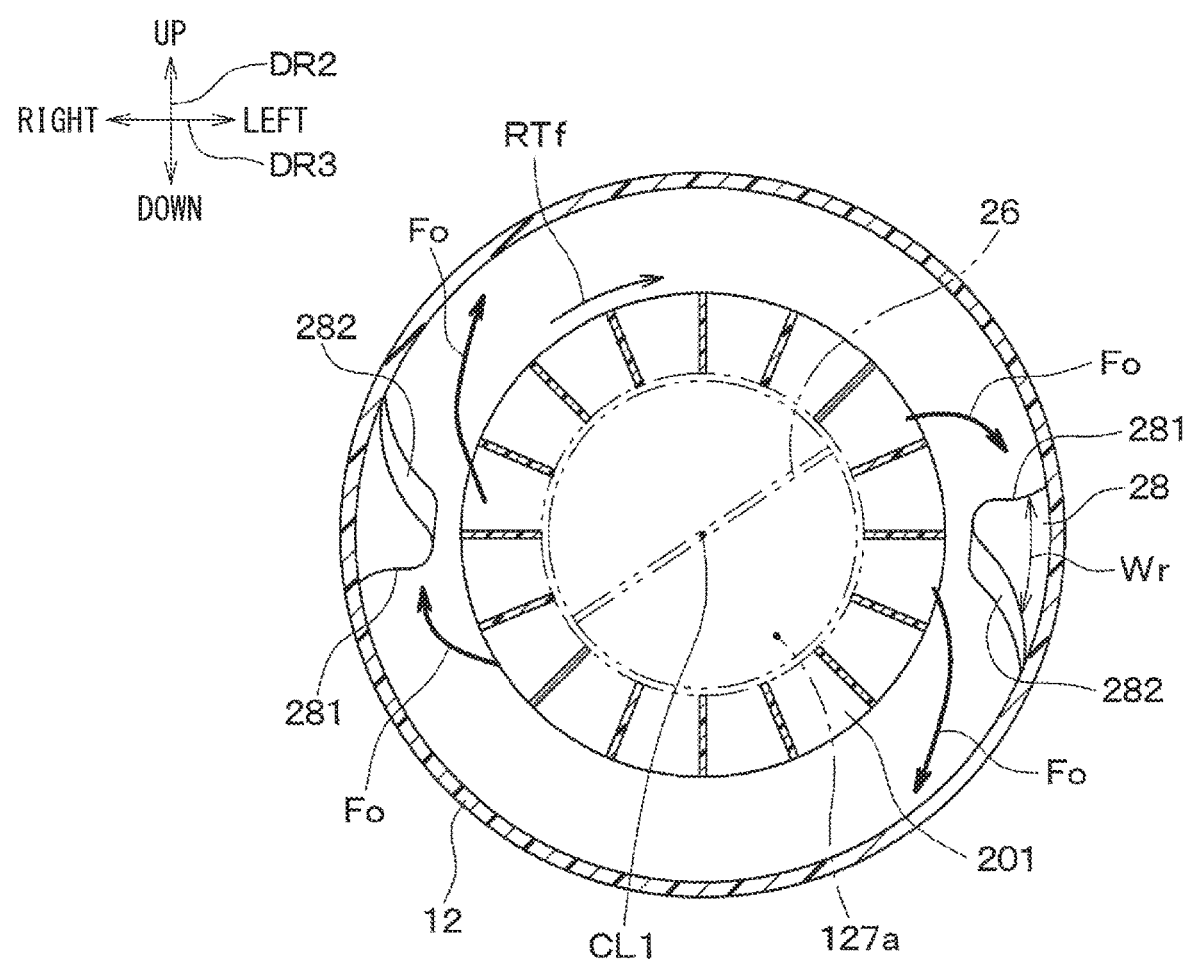
FIG. 17 is a cross-sectional view showing a cross section taken along line IX-IX of FIG. 1 in the fourth embodiment, and is a view corresponding to FIG. 9.

As shown in FIGS. 16 and 17, in the present embodiment, downstream side guide members 28 are arranged outside a blower fan 201 in a radial direction and have a first guide surface 281 and a second guide surface 282, similar to the first embodiment. Each of the first guide surface 281 and the second guide surface 282 is inclined with respect to the fan axis CL1 so as to be positioned on a forward direction side in a fan rotation direction RTf toward the other side in a fan axial direction DRa. However, in the present embodiment, a shape of the downstream side guide member 28 is different from that of the first embodiment.

Specifically, each of a plurality of downstream side guide members 28 has a shape that gradually expands in a circumferential direction of the blower fan 201 toward an outward side of a fan radial direction. In short, a width Wr of the downstream side guide member 28 in the circumferential direction becomes wide toward the outside in the fan radial direction. Therefore, it is possible to suppress occurrence of turbulence such as a vortex or the like in an air flow along the downstream side guide member 28. Note that an arrow Fo in FIG. 17 indicates an air flow blown out from the blower fan 201 and guided along the downstream side guide member 28.

The present embodiment is the same as the first embodiment except for those described above. In the present embodiment, effects achieved from a configuration common to the first embodiment described above can be obtained, similar to the first embodiment.

Note that the present embodiment is a modification based on the first embodiment, but it is possible to combine the present embodiment with the second embodiment described above.

Fifth Embodiment

Next, a fifth embodiment will be described. In the present embodiment, portions different from those of the first embodiment described above will be mainly described.

Figure 18:
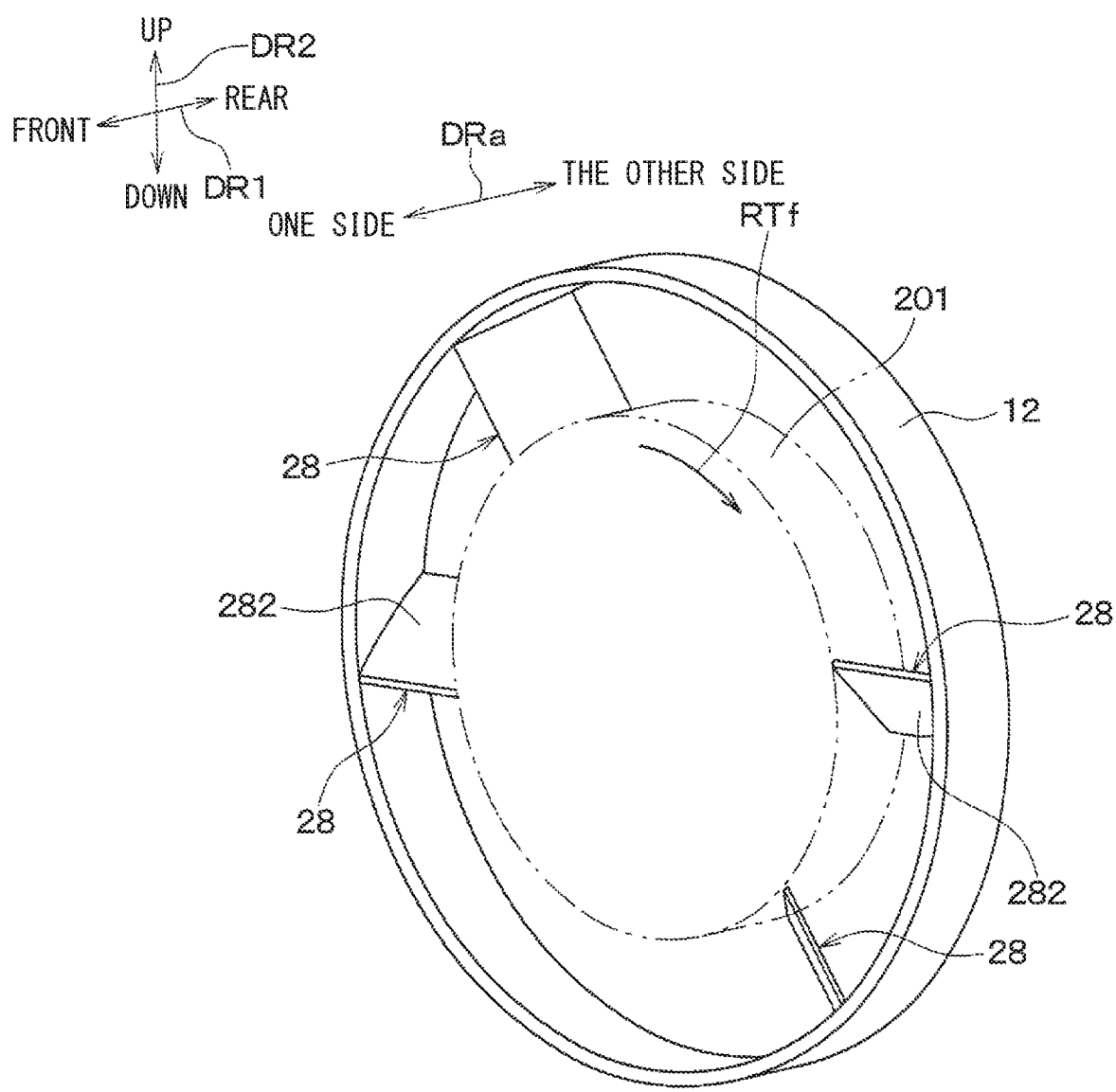
FIG. 18 is a perspective view extracting and showing a downstream side guide member and peripheral portions thereof in a fifth embodiment, and is a view corresponding to FIG. 3.
Figure 19:
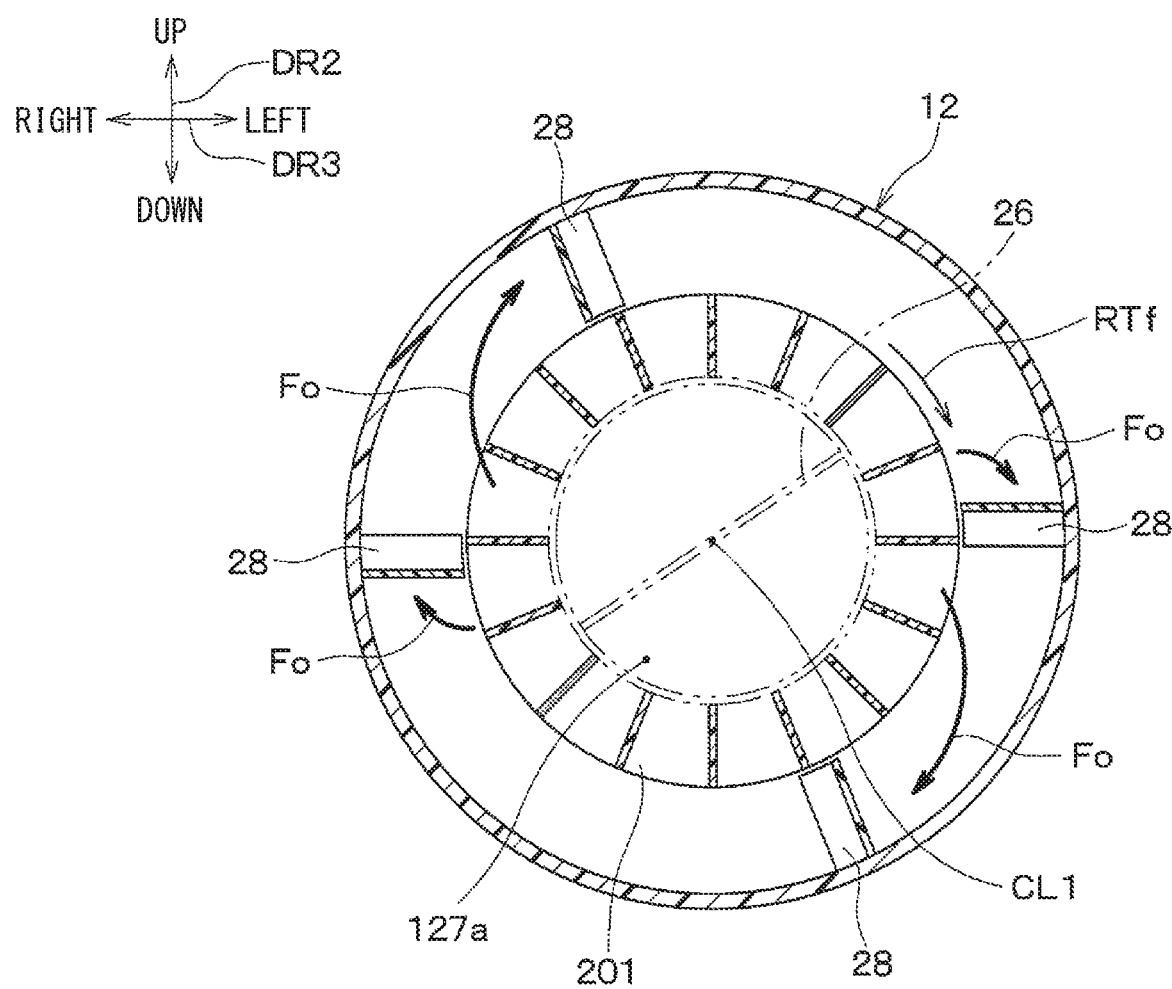
FIG. 19 is a cross-sectional view showing a cross section taken along line IX-IX of FIG. 1 in the fifth embodiment, and is a view corresponding to FIG. 9.

As shown in FIGS. 18 and 19, in the present embodiment, a total of four downstream side guide members 28 are provided. In this respect, the present embodiment is different from the first embodiment.

In addition, a plurality of downstream side guide members 28 of the present embodiment are provided side by side at an uneven pitch in a circumferential direction of a blower fan 201. Note that an arrow Fo in FIG. 19 indicates an air flow blown out from the blower fan 201 and guided along the downstream side guide member 28.

The present embodiment is the same as the first embodiment except for those described above. In the present embodiment, effects achieved from a configuration common to the first embodiment described above can be obtained, similar to the first embodiment.

Note that the present embodiment is a modification based on the first embodiment, but it is possible to combine the present embodiment with the second embodiment or the fourth embodiment described above.

Other Embodiments (1) In each of the embodiments described above, as shown in FIG. 1 and the like, the air-conditioning unit 10 for vehicles includes both of the upstream side guide member 26 and the downstream side guide member 28, but it is also conceivable that the air-conditioning unit 10 for vehicles includes one of the upstream side guide member 26 and the downstream side guide member 28 and does not include the other of the upstream side guide member 26 and the downstream side guide member 28.

(2) In each of the embodiments described above, as shown in FIGS. 5 and 8, one end 26a of the upstream side guide member 26 is arranged so as to be aligned with the other end 125a of the upstream side partition wall 125 in the fan axial direction DRa, but is not limited to thereto.

(3) In each of the embodiments described above, as shown in FIG. 10, all of the other ends 28a of the plurality of downstream side guide members 28 are arranged so as to be aligned with one end 126a of the downstream side partition wall 126 in the fan axial direction DRa, but are not limited to thereto. For example, it is also conceivable that any or all of the plurality of downstream side guide members 28 are provided such that the other ends 28a thereof are arranged at positions shifted with respect to one end 126a of the downstream side partition wall 126 in the circumferential direction of the blower fan 201.

(4) In the first embodiment described above, as shown in FIGS. 5 to 7, the upstream side guide member 26 has the shape twisted centered on the fan axis CL1, but the twisted shape need not be strictly centered on the fan axis CL1. In short, the twisted shape centered on the fan axis CL1 may be generally centered on the fan axis CL1. The same applies to each embodiment after the second embodiment.

(5) In each of the embodiments described above, as shown in FIG. 1 and the like, the fan axial direction DRa coincides with the front and rear direction DR1 of the vehicle, but is not limited thereto, and, for example, the blower fan 201 may be provided so that the fan axis CL1 is inclined with respect to the front and rear direction DR1 of the vehicle.

(6) In the fourth embodiment described above, as shown in FIG. 17, an outer shape of the air conditioning case 12 is formed regardless of a shape of the downstream side guide members 28 at places where the downstream side guide members 28 are provided, but this is an example. For example, the outer shape of the air conditioning case 12 may be recessed inward in the fan radial direction, following the shape of the downstream side guide members 28.

(7) In each of the embodiments described above, as shown in FIG. 1, the downstream side guide members 28 are arranged outside the blower fan 201 in the radial direction and are provided to be aligned with the blower fan 201 in the fan radial direction, but this is an example. For example, as shown in FIG. 20, the downstream side guide members 28 may be arranged so as to be shifted to the other side in the fan axial direction DRa with respect to the blower fan 201. In FIG. 20, the downstream side guide members 28 are not aligned with the blower fan 201 in the fan radial direction.

(8) In each of the embodiments described above, as shown in FIG. 1, both of the evaporator 16 and the heater core 18 are arranged on the air flow downstream side with respect to the blower fan 201, but this is an example. For example, the evaporator 16 and the heater core 18 may be arranged on the air flow upstream side with respect to the blower fan 201.

Alternatively, the evaporator 16 may be disposed on the air flow upstream side with respect to the blower fan 201, and the heater core 18 may be disposed on the air flow downstream side with respect to the blower fan 201.

(9) In each of the embodiment described above, as shown in FIGS. 3 and 10 and the like, the first and second guide surfaces 281 and 282 of the downstream side guide member 28 are inclined with respect to the fan axis CL1 so as to be positioned on the forward direction side in the fan rotation direction RTf toward the other side in the fan axial direction DRa. However, this is an example.

For example, it is also conceivable that the first and second guide surfaces 281 and 282 are not inclined with respect to the fan axis CL1 and are surfaces parallel to the fan axis CL1. In addition, as another example, it is also conceivable that the first and second guide surfaces 281 and 282 are inclined with respect to the fan axis CL1 so as to be positioned on an opposite direction side to the fan rotation direction RTf toward the other side in the fan axial direction DRa. The reason is that even in this case, the downstream side guide members 28 can suppress the rotation component given by the rotation of the blower fan 201, of the flow velocity of the air flowing out from the blower fan 201 by allowing the air flowing out from the blower fan 201 to flow along the downstream side guide members 28.

Note that the rotation component given by the rotation of the blower fan 201 is due to the rotation of the blower fan 201, and is thus a rotation component with the fan rotation direction RTf as a positive direction centered on the fan axis CL1. Therefore, the suppression of the rotation component given by the rotation of the blower fan 201 includes not only making the rotation component close to zero, but also changing the rotation component to a rotation component in a negative direction, that is, changing the rotation component to a rotation component in the opposite direction to the fan rotation direction RTf.

(10) In each of the embodiments described above, for example, as shown in FIG. 1, the blower fan 201 is the centrifugal fan, but is not limited thereto, and may be, for example, an axial fan or a mixed flow fan.

(11) In the first embodiment described above, as shown in FIGS. 1 and 8, the upstream side guide member 26 is connected to the upstream side partition wall 125. For that reason, the upstream side guide member 26 partitions and divides the air flowing out from the first upstream side ventilation path 121 and the air flowing out from the second upstream side ventilation path 122, but this may not be necessary. The same applies to each embodiment after the second embodiment.

(12) In the first embodiment described above, as shown in FIGS. 1 and 10, all of the other ends 28a of the plurality of downstream side guide members 28 are connected to one end 126a of the downstream side partition wall 126, but this is an example. For example, it is also conceivable that any or all of the other ends 28a of the downstream side guide members 28 are not connected to one end 126a of the downstream side partition wall 126.

(13) In the first embodiment described above, as shown in FIGS. 1 and 10, the downstream side guide member 28 is connected to the downstream side partition wall 126. For that reason, the downstream side guide member 28 partitions and divides the air flowing out from the first downstream side ventilation path 123 and the air flowing out from the second downstream side ventilation path 124, but this may not be necessary. The same applies to each embodiment after the second embodiment.

(14) In each of the embodiments as described above, as shown in FIG. 1 and the like, the number of the plurality of upstream side ventilation paths 121 and 122 formed in the air conditioning case 12 is two, but may be three or more. The same applies to the number of the plurality of downstream side ventilation paths 123 and 124.

(15) Note that the present disclosure is not limited to the embodiment described above, and can be variously modified. In addition, the respective embodiments described above are not irrelevant to each other, and can be suitably combined with each other unless a combination is clearly impossible. In addition, in each of the embodiments described above, it is needless to say that elements constituting the embodiment are not necessarily essential unless otherwise specified as being essential and unless clearly considered as being essential in principle.

In addition, in each of the embodiments described above, in a case where numerical values such as the number, numerical values, amounts, ranges, and the like, of components of the embodiment are mentioned, they are not limited to specific numbers unless otherwise specified as being essential and unless clearly limited to specific numbers in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

According to a first aspect shown in some or all of the respective embodiments described above, the upstream side guide member is provided on one side in the axial direction of the fan axis with respect to the blower fan in the air conditioning case. The upstream side guide member guides the air flowing out from the first upstream side ventilation path and the second upstream side ventilation path and flowing from one side to the other side, which is an opposite side to one side, in the axial direction to the blower fan. In addition, the upstream side guide member has the shape in which the other side of the upstream side guide member in the axial direction is twisted around the fan axis in the opposite direction to the rotation direction of the blower fan with respect to one side, and guides the air to the blower fan along the twisted shape.

In addition, according to a second aspect, the upstream side guide member guides the air flowing along the upstream side guide member so that the air flows in the opposite direction to the rotation direction of the blower fan in the circumferential direction of the blower fan as the air proceeds to the other side in the axial direction. Therefore, the respective air flows flowing out from the first and second upstream side ventilation paths are rotated in the opposite direction to the rotation direction of the blower fan in advance, and then flow into the blower fan. This acts in a direction in which the phase shift around the fan axis generated due to the rotation of the blower fan in the mutual arrangement of the plurality of air flows flowing from the first and second upstream side ventilation paths is canceled. Therefore, it is possible to suppress the phase shift.

In addition, according to a third aspect, the air conditioning case has the upstream side partition wall. The upstream side partition wall is arranged between the first upstream side ventilation path and the second upstream side ventilation path, and partitions between the first upstream side ventilation path and the second upstream side ventilation path. The upstream side guide member is connected to the upstream side partition wall. Therefore, in a process until the air flowing out from the first and second upstream side ventilation paths is guided to the upstream side guide member, it becomes easy to suppress the air from the first upstream side ventilation path and the air from the second upstream side ventilation path from being mixed with each other.

In addition, according to a fourth aspect, the upstream side partition wall has the other end on the other side in the axial direction, and is arranged on one side in the axial direction with respect to the upstream side guide member. The upstream side guide member has one end on one side in the axial direction, and one end of the upstream side guide member is arranged so as to be aligned with the other end of the upstream side partition wall in the axial direction. Even in this case, similar to the third aspect, in a process until the air flowing out from the first and second upstream side ventilation paths is guided to the upstream side guide member, it becomes easy to suppress the air from the first upstream side ventilation path and the air from the second upstream side ventilation path from being mixed with each other.

In addition, according to a fifth aspect, the upstream side guide member partitions and divides air passages from the plurality of upstream side ventilation paths to the blower fan into a plurality of upstream side guide passages provided in parallel with each other. The number of the plurality of upstream side guide passages is larger than that of the plurality of upstream side ventilation paths. According to such a configuration, for example, as compared with a case where the number of the plurality of upstream side guide passages is the same as that of the plurality of upstream side ventilation paths, it becomes easy to rotate all air flows flowing out from the plurality of upstream side ventilation paths around the fan axis according to the twisted shape of the upstream side guide member.

In addition, according to a sixth aspect, the plurality of downstream side guide members are provided in the air conditioning case, and guide the air flowing out from the blower fan to the first downstream side ventilation path and the second downstream side ventilation path. The plurality of downstream side guide members suppress the rotation component given by the rotation of the blower fan, of the flow velocity of the air flowing out from the blower fan by allowing the air flowing out from the blower fan to flow along the downstream side guide members. The same applies to a seventh aspect.

In addition, according to an eighth aspect, the blower fan is the centrifugal fan. The plurality of downstream side guide members are arranged outside the blower fan in the radial direction and are arranged side by side in the circumferential direction of the blower fan. According to such a configuration, it is possible to suppress the air conditioning case from becoming longer in the axial direction due to the provision of the downstream side guide members in the air conditioning case.

In addition, according to a ninth aspect, each of the plurality of downstream side guide members has the plate shape provided so as to intersect the circumferential direction of the blower fan, and is bent so as to be positioned on the forward direction side in the rotation direction of the blower fan toward the outside in the radial direction of the blower fan. Therefore, as the air flowing out from the blower fan moves toward the outside in the radial direction of the blower fan, it is possible to gently suppress the rotation component included in the flow velocity of the air.

In addition, according to a tenth aspect, each of the plurality of downstream side guide members is formed so as to be widened in the circumferential direction of the blower fan toward the outside in the radial direction of the blower fan. Therefore, it is possible to suppress the occurrence of the turbulence such as the vortex or the like in the air flow along the downstream side guide member.

In addition, according to an eleventh aspect, the plurality of downstream side guide members have the guide surface facing the side facing the rotation direction of the blower fan in the circumferential direction of the blower fan, and suppress the rotation component by allowing the air flowing out from the blower fan to flow along the guide surface. The guide surface has the other end on the other side that is an opposite side to one side in the axial direction, and the other end of the guide surface is the downstream end of the air flow along the guide surface. The guide surface is inclined with respect to the fan axis so as to be positioned on the forward direction side in the rotation direction of the blower fan toward the other side in the axial direction.

Therefore, it is possible to gently suppress the rotation component included in the air flow flowing out from the blower fan. For example, the flow velocity of the air flow is high on the outlet side of the blower fan, but if the direction of the air flow of such a high flow velocity turns to the opposite direction to the rotation direction of the blower fan, a large pressure loss occurs in the air flow. In this regard, if the guide surface is inclined with respect to the fan axis described above, the direction of the air flow flowing out from the blower fan does not turn to the opposite direction to the rotation direction of the blower fan, and it is thus possible to avoid occurrence of such a large pressure loss.

In addition, according to a twelfth aspect, the air conditioning case has the downstream side partition wall. The downstream side partition wall is arranged between the first downstream side ventilation path and the second downstream side ventilation path, and partitions between the first downstream side ventilation path and the second downstream side ventilation path. Any or all of the plurality of downstream side guide members are connected to the downstream side partition wall. Therefore, before the air guided to the downstream side guide members flows into the first and second downstream side ventilation paths, it becomes easy to suppress the air flowing into the first downstream side ventilation path and the air flowing into the second downstream side ventilation path from being mixed with each other.

In addition, according to a thirteenth aspect, the downstream side partition wall has one end on one side in the axial direction. Each of the plurality of downstream side guide members has the other end on the other side in the axial direction, and is arranged on one side in the axial direction with respect to the downstream side partition wall. Any or all of the other ends of the plurality of downstream side guide members are arranged so as to be aligned with one end of the downstream side partition wall in the axial direction. Even in this case, similar to the twelfth aspect, before the air guided to the downstream side guide members flows into the first and second downstream side ventilation paths, it becomes easy to suppress the air flowing into the first downstream side ventilation path and the air flowing into the second downstream side ventilation path from being mixed with each other.

The invention claimed is:

1. An air-conditioning unit for a vehicle, comprising:
   an air conditioning case that defines therein a first upstream side ventilation path through which air flows, a second upstream side ventilation path through which air flows and which is in parallel with the first upstream side ventilation path, a first downstream side ventilation path through which the air flowing out from the first upstream side ventilation path flows, and a second downstream side ventilation path which is in parallel with the first downstream side ventilation path and through which the air flowing out from the second upstream side ventilation path flows;
   a blower that includes a blower fan rotating about a fan axis in the air conditioning case, the blower drawing in air flowing out of the first upstream side ventilation path and the second upstream side ventilation path in an axial direction of the fan axis by rotation of the blower fan, the blower causing the drawn air to flow toward the first downstream side ventilation path and the second downstream side ventilation path; and
   an upstream side guide member that is located on an upstream side of the blower fan in the axial direction in the air conditioning case and guides, toward the blower fan, the air flowing out of the first upstream side ventilation path and the second upstream side ventilation path from an upstream side to a downstream side that is opposite to the upstream side in the axial direction, wherein
   the upstream side guide member has a twisted shape in which the downstream side of the upstream side guide member in the axial direction is twisted relative to the upstream side of the upstream side guide member about the fan axis in a direction opposite to a rotation direction of the blower fan, and
   the upstream side guide member guides the air toward the blower fan along the twisted shape.

2. The air-conditioning unit for a vehicle according to claim 1, wherein
   the upstream side guide member guides the air so that the air flows in the direction opposite to the rotation direction of the blower fan in a circumferential direction of the blower fan as the air proceeds in the axial direction.

3. The air-conditioning unit for a vehicle according to claim 1, wherein
   the air conditioning case includes an upstream side partition wall that is disposed between the first upstream side ventilation path and the second upstream side ventilation path to divide between the first upstream side ventilation path and the second upstream side ventilation path, and
   the upstream side guide member is connected to the upstream side partition wall.

4. The air-conditioning unit for a vehicle according to claim 1, wherein
   the air conditioning case has an upstream side partition wall that is disposed between the first upstream side ventilation path and the second upstream side ventilation path to divide between the first upstream side ventilation path and the second upstream side ventilation path,
   the upstream side partition wall has a first end disposed on the upstream side of the upstream side guide member in the axial direction,
   the upstream side guide member has a first end, and
   the first end of the upstream side guide member is aligned with the first end of the upstream side partition wall in the axial direction.

5. The air-conditioning unit for a vehicle according to claim 1, further comprising
   a plurality of upstream side ventilation paths including the first upstream side ventilation path and the second upstream side ventilation path, the plurality of upstream side ventilation paths defined in the air conditioning case at positions upstream of the upstream side guide member, air flowing through the plurality of upstream side ventilation paths, wherein the upstream side guide member divides an air passage from the plurality of upstream side ventilation paths to the blower fan into a plurality of upstream side guide passages that are in parallel with each other, and the number of the plurality of upstream side guide passages is greater than that of the plurality of upstream side ventilation paths.

6. The air-conditioning unit for a vehicle according to claim 1, further comprising a plurality of downstream side guide members that are disposed in the air conditioning case and guide the air flowing out from the blower fan toward the first downstream side ventilation path and the second downstream side ventilation path, wherein the plurality of downstream side guide members are configured to decrease a rotation component, which is given by the rotation of the blower fan, of a flow velocity of the air flowing out from the blower fan by guiding the air along the plurality of downstream side guide members.

7. The air-conditioning unit for a vehicle according to claim 6, wherein the blower fan is a centrifugal fan, and the plurality of downstream side guide members are disposed outside of the blower fan in a radial direction and are arranged side by side along a circumferential direction of the blower fan.

8. The air-conditioning unit for a vehicle according to claim 6, wherein each of the plurality of downstream side guide members includes a guide surface that faces to be opposite to the rotation direction of the blower fan in the circumferential direction of the blower fan, each of the plurality of downstream side guide members configured to decrease the rotation component by guiding the air flowing out from the blower fan along the guide surface, the guide surface has an end, the end of the guide surface is a downstream end for an airflow along the guide surface, and the guide surface is angled relative to the fan axis so that the end of the guide surface is positioned on a forward side of the rotation direction of the blower fan.

9. The air-conditioning unit for a vehicle according to claim 6, wherein the air conditioning case includes a downstream side partition wall that is disposed between the first downstream side ventilation path and the second downstream side ventilation path to divide between the first downstream side ventilation path and the second downstream side ventilation path, and at least one of the plurality of downstream side guide members is connected to the downstream side partition wall.

10. The air-conditioning unit for a vehicle according to claim 6, wherein the air conditioning case includes a downstream side partition wall that is disposed between the first downstream side ventilation path and the second downstream side ventilation path to divide between the first downstream side ventilation path and the second downstream side ventilation path, and the downstream side partition wall has an end, each of the plurality of downstream side guide members has an end, each of the plurality of downstream side guide member is disposed on an upstream side of the downstream side partition wall in the axial direction, and at least one of the ends of the plurality of downstream side guide members is aligned with the end of the downstream side partition wall in the axial direction.

11. The air-conditioning unit for a vehicle according to claim 1, wherein an upstream edge of the upstream side guide member is aligned with an upstream side partition wall disposed between the first upstream side ventilation path and the second upstream side ventilation path in the air conditioning case.

12. The air-conditioning unit for a vehicle according to claim 1, wherein the blower is a radial blower.

13. The air-conditioning unit for a vehicle according to claim 1, wherein the blower is located immediately downstream of the upstream side guide member.

14. An air-conditioning unit for a vehicle, comprising:

an air conditioning case that defines a first upstream side ventilation path through which air flows, a second upstream side ventilation path through which air flows and which is in parallel with the first upstream side ventilation path, a first downstream side ventilation path through which the air flowing out of the first upstream side ventilation path flows, and a second downstream side ventilation path which is in parallel with the first downstream side ventilation path and through which the air flowing out of the second upstream side ventilation path flows;

a blower that includes a blower fan rotating about a fan axis in the air conditioning case, the blower drawing in air flowing out of the first upstream side ventilation path and the second upstream side ventilation path from one side of the fan axis in an axial direction by rotation of the blower fan, the blower causing the drawn air to flow toward the first downstream side ventilation path and the second downstream side ventilation path; and a plurality of downstream side guide members that are disposed in the air conditioning case and guide the air flowing out from the blower fan toward the first downstream side ventilation path and the second downstream side ventilation path, wherein the blower fan is a centrifugal fan, the plurality of downstream side guide members are radially disposed entirely outside of the blower fan and are arranged side by side along a circumferential direction of the blower fan, and the plurality of downstream side guide members are configured to decrease a rotation component, which is given by the rotation of the blower fan, of a flow velocity of the air flowing out from the blower fan by guiding the air flowing out from the blower fan along the plurality of downstream side guide members.

15. The air-conditioning unit for a vehicle according to claim 14, wherein each of the plurality of downstream side guide members has a plate shape intersecting the circumferential direction of the blower fan, and each of the plurality of downstream side guide members is curved so that an outward portion of each of the plurality of downstream side guide members in the radial direction of the blower fan is positioned on a forward side of a rotation direction of the blower fan.

16. The air-conditioning unit for a vehicle according to claim 14, wherein
each of the plurality of downstream side guide members has a shape that gradually expands in the circumferential direction of the blower fan toward an outward side of the radial direction of the blower fan.

* * * * *